US010331088B2

(12) United States Patent
Boeck et al.

(10) Patent No.: US 10,331,088 B2
(45) Date of Patent: Jun. 25, 2019

(54) MACHINE TOOL DEVICE

(71) Applicant: Robert Bosch GmbH, Stuttgart (DE)

(72) Inventors: Cornelius Boeck, Kirchheim (DE);
Daniel Barth, Leinfelden-Echterdingen (DE); Joachim Schadow, Stuttgart (DE); Joerg Maute, Sindelfingen (DE); Joern Stock, Bempflingen (DE); Florian Esenwein, Leinfelden-Echterdingen (DE); Manfred Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 197 days.

(21) Appl. No.: 15/114,382

(22) PCT Filed: Feb. 25, 2015

(86) PCT No.: PCT/EP2015/053917
§ 371 (c)(1),
(2) Date: Jul. 26, 2016

(87) PCT Pub. No.: WO2015/172900
PCT Pub. Date: Nov. 19, 2015

(65) Prior Publication Data
US 2016/0342142 A1  Nov. 24, 2016

(30) Foreign Application Priority Data
May 13, 2014 (DE) .......... 10 2014 209 032

(51) Int. Cl.
*G06F 19/00* (2018.01)
*G05B 9/02* (2006.01)
(Continued)

(52) U.S. Cl.
CPC ............. *G05B 9/02* (2013.01); *B24B 23/02* (2013.01); *B24B 23/028* (2013.01); *B24B 55/00* (2013.01);
(Continued)

(58) Field of Classification Search
CPC ........... B23Q 11/0092; B23Q 11/0071; B23D 57/023; B23D 59/001; B23D 51/02;
(Continued)

(56) References Cited

U.S. PATENT DOCUMENTS 6,105,205 A * 8/2000 Takahashi ............... A47L 9/248
   15/326
7,377,202 B1   5/2008 Shibata
(Continued)

FOREIGN PATENT DOCUMENTS

DE   20 2004 021 173 U1   2/2007
DE   10 2007 035 095 A1   1/2009
(Continued)

OTHER PUBLICATIONS

International Search Report corresponding to PCT Application No. PCT/EP2015/053917, dated Jul. 16, 2015 (German and English language document) (7 pages).

*Primary Examiner* — Tuan A Vu
(74) *Attorney, Agent, or Firm* — Maginot, Moore & Beck LLP

(57) ABSTRACT

A machine tool device includes at least one open and/or closed-loop control unit and at least one drive unit sensor unit configured to determine at least one drive unit characteristic variable that can be processed at least for the purpose of open and/or closed-loop control of a drive unit of a machine tool and/or for issuing information to an operator of said open and/or closed-loop control unit. The machine tool device further includes at least one environment sensor unit
(Continued)

configured to determine at least one environment characteristic variable that can be processed at least for the purpose of open and/or closed-loop control of the drive unit and/or for issuing information to an operator of said open and/or closed-loop control unit.

7 Claims, 6 Drawing Sheets

(51) Int. Cl.
    *B25F 5/00*     (2006.01)
    *B24B 23/02*     (2006.01)
    *B24B 55/00*     (2006.01)
    *H02P 6/00*     (2016.01)
    *B25F 5/02*     (2006.01)

(52) U.S. Cl.
    CPC ............... *B25F 5/00* (2013.01); *B25F 5/021* (2013.01); *H02P 6/00* (2013.01)

(58) Field of Classification Search
    CPC ... H04L 69/03; H02P 6/16; B25F 5/00; B25B 21/00; A47L 9/248; A47L 9/1418; A61B 17/151
    See application file for complete search history.

(56) References Cited

U.S. PATENT DOCUMENTS

| | | | |
|---|---|---|---|
| 2002/0050364 A1 | 5/2002 | Suzuki et al. | |
| 2004/0144552 A1 | 7/2004 | Suzuki et al. | |
| 2006/0155582 A1 | 7/2006 | Brown | |
| 2006/0234617 A1* | 10/2006 | Francis | B23D 59/001 452/174 |
| 2007/0085496 A1* | 4/2007 | Philipp | A61B 17/151 318/139 |
| 2011/0114345 A1* | 5/2011 | Schlesak | B23Q 11/0092 173/1 |
| 2012/0169485 A1 | 7/2012 | Eckert | |
| 2013/0187587 A1* | 7/2013 | Knight | H02P 6/16 318/400.37 |
| 2013/0192860 A1* | 8/2013 | Puzio | B25F 5/00 173/47 |
| 2014/0025834 A1* | 1/2014 | Mergener | H04L 69/03 709/230 |
| 2014/0070924 A1 | 3/2014 | Wenger et al. | |
| 2016/0311094 A1* | 10/2016 | Mergener | B25F 5/00 |

FOREIGN PATENT DOCUMENTS

| | | |
|---|---|---|
| DE | 10 2009 035 134 A1 | 2/2011 |
| DE | 10 2010 041 726 A1 | 4/2012 |
| DE | 10 2011 053 799 A1 | 3/2013 |
| DE | 10 2012 202 116 A1 | 8/2013 |
| DE | 10 2012 208 180 A1 | 11/2013 |
| DE | 10 2012 221 997 A1 | 11/2013 |
| DE | 10 2012 211 354 A1 | 1/2014 |
| DE | 10 2012 221 580 A1 | 1/2014 |
| EP | 1 902 817 A2 | 3/2008 |
| EP | 2 617 529 A2 | 7/2013 |
| JP | 7-328967 A | 12/1995 |
| JP | 2004-160564 A | 6/2004 |
| JP | 2005-297186 A | 10/2005 |
| JP | 2006-299950 A | 11/2006 |
| JP | 2008-504136 A | 2/2008 |
| JP | 2009-12151 A | 1/2009 |
| JP | 2012-86343 A | 5/2012 |
| JP | 2013-66949 A | 4/2013 |
| JP | 2013-233636 A | 11/2013 |

* cited by examiner

MACHINE TOOL DEVICE

This application is a 35 U.S.C. § 371 National Stage Application of PCT/EP2015/053917, filed on Feb. 25, 2015, which claims the benefit of priority to Serial No. DE 10 2014 209 032.6, filed on May 13, 2014 in Germany, the disclosures of which are incorporated herein by reference in their entirety.

BACKGROUND

US 2013/0187587 A1 already discloses a power tool device, in particular a handheld power tool device, which comprises an open-loop and/or closed-loop control unit and a drive unit sensor unit for recording at least one drive unit characteristic variable, wherein the drive unit characteristic variable can be processed by the open-loop and/or closed-loop control unit for providing an open-loop and/or closed-loop control of a drive unit of a power tool and/or for providing an output of information to an operator.

SUMMARY

The disclosure is based on a power tool device, in particular on a handheld power tool device, with at least one open-loop and/or closed-loop control unit and with at least one drive unit sensor unit for recording at least one drive unit characteristic variable, which can be processed by the open-loop and/or closed-loop control unit at least for providing an open-loop and/or closed-loop control of a drive unit of a power tool and/or for providing an output of information to an operator.

It is proposed that the power tool device comprises at least one ambient sensor unit for recording at least one ambient characteristic variable, which can be processed by the open-loop and/or closed-loop control unit at least for providing an open-loop and/or closed-loop control of the drive unit and/or for providing an output of information to an operator. An "ambient sensor unit" is to be understood as meaning in particular here a sensor unit that has at least one ambient sensor element for recording at least one ambient characteristic variable, which defines an environment surrounding the power tool device, defines an impact of the power tool device on the surrounding environment and/or defines a positioning of the power tool device in relation to the surrounding environment. The ambient sensor unit is preferably intended here for recording at least one ambient pressure, an ambient temperature, a noise emission of a power tool comprising the power tool device, an electromagnetic radiation, a dust generation characteristic variable, a spark formation characteristic variable, an odor characteristic variable, a pollutant characteristic variable, a global position and/or a spatial position of the power tool device, a moisture characteristic variable, a pH characteristic variable, a gas characteristic variable or the like. The open-loop and/or closed-loop control unit is at least preferably intended for controlling the drive unit in an open-loop and/or closed-loop manner in dependence on the at least one drive unit characteristic variable recorded by the drive unit sensor unit and in dependence on the at least one ambient characteristic variable recorded by means of the ambient sensor unit. In addition, the open-loop and/or closed-loop control unit is preferably intended at least for outputting to an operator information in dependence on the at least one drive unit characteristic variable recorded by means of the drive unit sensor unit and in dependence on the at least one ambient characteristic variable recorded by means of the ambient sensor unit. Preferably, at least one drive unit characteristic curve, a maximum rotational speed, a minimum rotational speed, a maximum torque and/or a minimum torque of the drive unit can be controlled in an open-loop and/or closed-loop manner by means of the open-loop and/or closed-loop control unit.

Moreover, it is conceivable that the open-loop and/or closed-loop control unit is intended for controlling a ventilator system of a power tool comprising the power tool device in an open-loop and/or closed-loop manner in dependence on the at least one drive unit characteristic variable recorded by means of the drive unit sensor unit and in dependence on the at least one ambient characteristic variable recorded by means of the ambient sensor unit. This can be achieved for example by a closing of dampers, and consequently by a reduction of an air stream. Ventilator noise can be advantageously reduced. Moreover, an active modification of transmission play by means of the open-loop and/or closed-loop control unit in dependence on the at least one drive unit characteristic variable recorded by means of the drive unit sensor unit and in dependence on the at least one ambient characteristic variable recorded by means of the ambient sensor unit is likewise conceivable, in order to reduce transmission noise. An "open-loop and/or closed-loop control unit" is to be understood in particular as meaning a unit with at least one set of control electronics. "Control electronics" is to be understood in particular as meaning a unit with a processor unit and with a memory unit and also with an operating program stored in the memory unit. "Intended" is to be understood in particular as meaning specifically programmed, specifically designed and/or specifically equipped. Saying that an element and/or a unit is/are intended for a specific function is to be understood in particular as meaning that the element and/or the unit fulfills/fulfill and/or performs/perform this specific function in at least one application state and/or operating state.

The drive unit sensor unit is preferably intended for recording at least one drive unit characteristic variable of a drive unit formed as an electric motor unit, in particular as a brushless electric motor unit. Consequently, the drive unit sensor unit is preferably formed as an EC electric motor drive unit sensor unit. The drive unit characteristic variable may be formed here as a drive unit current, as a drive unit voltage, as a drive unit angle of rotation, as an electrical drive unit resistance, as a drive unit magnetic field characteristic variable, as an electromotive force characteristic variable of the drive unit, as a drive unit rotational speed, as a drive unit torque, as a drive unit angular velocity, as a drive unit rotor position, as a drive unit direction of rotation, as a drive unit temperature or as a further drive unit characteristic variable that appears appropriate to a person skilled in the art. The drive unit characteristic variable is preferably different from a straightforward switch actuation of a switch by an operator. The drive unit sensor unit comprises at least one drive unit sensor element for recording the at least one drive unit characteristic variable. The drive unit sensor element may be formed here as a drive unit current sensor, as a drive unit voltage sensor, as a drive unit angle of rotation sensor, as an electrical drive unit resistance sensor, as a drive unit magnetic field sensor, as an electromotive force characteristic variable sensor, as a drive unit rotational speed sensor, as a drive unit torque sensor, as a drive unit angular speed sensor, as a drive unit rotor position sensor, as a drive unit direction of rotation sensor, as a drive unit temperature sensor or as another drive unit sensor element that appears appropriate to a person skilled in the art.

An information output unit for providing an output of information to an operator is preferably formed as an optical, acoustic and/or haptic information output unit. Here, the information output unit is preferably a component part of the power tool device. It is however also conceivable that the information output unit is a component part of a power tool comprising the power tool device or a component part of an external unit, such as for example a smartphone, a tablet, a PC, a laptop or the like. For providing an output of information to an operator, the information output unit preferably comprises at least one optical output unit, such as for example an LC display, a touch-sensitive display, an LED display, a plasma display or the like for providing an optical output of information to an operator. Preferably, the information output unit comprises at least one acoustic output unit, such as for example a loudspeaker or the like, for providing an acoustic output of information to an operator. Particularly preferably, the information output unit comprises at least one haptic output unit, such as for example a vibration exciter unit or the like, for providing a haptic output of information to an operator. It is however also conceivable that an output of information to an operator takes place as a result of an activation of the drive unit by means of the open-loop and/or closed-loop control unit. It is conceivable here that an output of information to an operator takes place for example due to a fluctuation in rotational speed of a drive unit rotational speed or the like. Further drive-unit-related information outputs to an operator that appear appropriate to a person skilled in the art are likewise conceivable. By means of the configuration according to the disclosure of the power tool device, compliance with emission limits can be advantageously made possible. Consequently, machining of workpieces at locations at which emission limits apply can be advantageously made possible. Moreover, a low level of nuisance for persons in the vicinity of workpiece machining is advantageously achievable. Consequently, low-emission machining of workpieces can be advantageously realized. Moreover, a high level of operator safety can be advantageously achieved, since for example a spatial alignment of the power tool device and a global position of the power tool device can be used in combination with location-related safety requirements for providing an open-loop and/or closed-loop control of the drive unit and/or of safety functions. Consequently, an operator can be advantageously protected from injuries.

Furthermore, it is proposed that the power tool device comprises at least one communication unit for communication with at least one external unit for an exchange of electronic data at least for providing an open-loop and/or closed-loop control of the drive unit. The communication unit is preferably formed as a cableless communication unit. Here, the communication unit may be formed as a WLAN communication unit, as a Bluetooth communication unit, as a radio communication unit, as an RFID communication unit, as an NFC unit, as an infrared communication unit, as a mobile radio network communication unit or the like. Particularly preferably, the open-loop and/or closed-loop control unit is intended for controlling the drive unit and/or safety functions in an open-loop and/or closed-loop manner in dependence on the at least one ambient characteristic variable recorded by means of the ambient sensor unit and in dependence on electronic data transmitted by means of the communication unit to the open-loop and/or closed-loop control unit. Particularly preferably, the communication unit is intended for bidirectional data transmission. In an alternative configuration, the communication unit is formed as a cable-bound communication unit, such as for example as an LAN communication unit, as a USB communication unit or the like. The external unit is preferably formed as a smartphone, which has an app for communication with the communication unit. It is however also conceivable that the external unit is formed as an external, transportable operator control unit, as a permanently installed operator control unit at a workplace of an operator, as a place-of-use synchronization unit permanently installed in a room, which can be controlled by a central station, such as for example as a result of company rules/safety regulations, as an operator body characteristic variable monitoring unit, as an external sensor unit or as a further centralized or decentralized operator control unit, input station and/or centralized or decentralized terminal that appears appropriate to a person skilled in the art. Consequently, a synchronization of electronic data can be advantageously made possible. If, for example, a power tool comprising the power tool device is put into operation in a synchronization mode, for example by plugging in a rechargeable battery device, when a power supply cable is plugged in or by activation by an operator, a connection between the communication unit and the external unit is set up at least partially automatically. Settings stored in the external unit are consequently preferably directly transmittable to the power tool comprising the power tool device. These may be individual settings of an operator, such as for example a desired rapid run-up to a set rotational speed and maximum power and/or company rules, such as for example compliance with a safety function in a designated area of company premises or a place of use, etc.

Moreover, electronic data can be transmitted by means of the communication unit to the external unit. For example, it is possible here to transmit to a company central office or the like an exposure of an operator to vibration, to check whether an exposure limit is being maintained, and/or a possible payment of bonuses and/or a running time and a load, to assess capacity utilization of a power tool. It is also conceivable that the external unit checks for the presence of safety equipment and/or suitable work clothing, such as for example by means of radio frequency identification etc., wherein, in dependence on detected safety equipment and/or suitable work clothing, the external unit transmits settings for providing open-loop and/or closed-loop control of the drive unit and/or safety functions of the power tool comprising the power tool device by way of the communication unit to the open-loop and/or closed-loop control unit.

In particular when machining a workpiece in a room, such as for example an office, emissions, such as for example sound emissions, can be transmitted by means of structure-borne sound to further areas of a building in which the room is located. To obtain a low level of exposure of persons in the building to the emissions that are produced during machining of the workpiece in the room, preferably at least one external unit formed as a sensor unit and intended for recording emission characteristic variables can be arranged in the further area of the building. The emission characteristic variables recorded can advantageously be transmitted to the open-loop and/or closed-loop control unit by means of the communication unit. The open-loop and/or closed-loop control unit preferably controls the drive unit here in an open-loop and/or closed-loop manner in dependence on the emission limits. As a result, machining of a workpiece can be advantageously performed in one room of a building while exposing persons in other areas of the building to a low level of nuisance as a result of the emission. Moreover, by means of the communication unit, preferably a synchronization of the power tool device with a time of day is conceivable. In this way, midday rest periods in particular can be observed. Consequently, the drive unit can be controlled in an open-loop and/or closed-loop manner by means of the open-loop and/or closed-loop control unit in dependence on a time of day. Observance of a rest period can be advantageously achieved. Moreover, by means of the configuration according to the disclosure, a convenient, in particular centralized, setting of characteristic variables of a power tool comprising the power tool device can advantageously take place. Furthermore, a communication between the open-loop and/or closed-loop control unit and an external unit formed as an emission threshold value monitoring unit and/or some other external unit that appears appropriate to a person skilled in the art can advantageously take place, in order advantageously to control safety functions in an open-loop and/or closed-loop manner. Consequently, a high degree of consideration for persons in the vicinity of a workplace can be advantageously maintained.

It is further proposed that the open-loop and/or closed-loop control unit is intended for accessing by means of the communication unit a central database, in which there is stored at least one safety and/or operating area rule, which can be processed by the open-loop and/or closed-loop control unit at least for providing an open-loop and/or closed-loop control of the drive unit. Consequently, the open-loop and/or closed-loop control unit is preferably intended for controlling at least the drive unit of the portable power tool in an open-loop and/or closed-loop manner in dependence on at least one safety and/or operating area rule of an area of an infrastructure. Allowance can be made in particular for a location, such as for example a global position, at which the portable power tool is used within the infrastructure. Moreover, it is conceivable that the open-loop and/or closed-loop control unit is intended for controlling further functions of the portable power tool in an open-loop and/or closed-loop manner, such as for example a safety function (kickback function or the like) in dependence on at least one safety and/or operating area rule of an area of an infrastructure. Moreover, it is conceivable that locations, such as for example construction sites, outside the infrastructure are covered by means of a digital safety and/or operating area rule grid on the basis of GPS data, by means of which an assignment of safety and/or operating area rules for a location outside the infrastructure can be achieved.

The term "central database" is to be understood in particular as defining here a database that is maintained and/or managed centrally by a management unit, such as for example by a building management, by a safety management or the like. Data, in particular electronic data, which define specific rules, regulations, risk potentials, safety categories or the like for at least one area of an infrastructure, in particular an area of a works premises, an area of a workshop or the like, are preferably stored in the central database. In an infrastructure, in particular in an infrastructure of a works premises, there are laboratories, workshops, offices or the like, which have different risk potentials. Here, the facility management (FCM) bears responsibility in particular for technical facilities and/or individual areas of the infrastructure. Risk assessments are preferably carried out regularly by health and safety engineers (HSE) for technical facilities and/or for individual areas of the infrastructure. Consequently, individual component parts of the infrastructure, such as for example individual laboratories, individual workshops and/or individual offices, are preferably assigned specific rules, regulations, safety categories or the like. For example, an assignment that stipulates that high to very high safety standards are to be maintained may be performed. Explosion protection may for example apply here in individual areas of the infrastructure, in particular in certain rooms. Consequently, work during which for example sparks may occur is preferably prohibited in these areas, or only certain power tools are allowed to carry out the work. Furthermore, assignments with moderate to low safety standards are conceivable. Moreover, assignments that concern vibration and/or noise limits are additionally or alternatively conceivable.

The central database is preferably updated at regular time intervals, in particular by an employee of the facility management and/or by a health and safety engineer (HSE). This preferably involves risk assessments being carried out for the individual areas of the infrastructure, such as for example for individual rooms, laboratories, workshops or the like. On the basis of these risk assessments, it is possible to store in the central database corresponding electronic data which, in dependence on a degree of risk, stipulate for the individual areas of the infrastructure use and/or operation characteristic variables relating to the use and/or operation of a portable power tool, such as for example compliance with prescribed rules of behavior, presence of personal protective equipment (PPE), establishment of access authorization, an obligation to provide evidence of further training or instruction. By means of the configuration according to the disclosure, a high level of user safety can consequently be advantageously achieved, since by means of the open-loop and/or closed-loop control unit there is an automatic inclusion of safety and/or operating area rules. Consequently, a location- and/or rule-dependent open-loop and/or closed-loop control of the portable power tool can be advantageously achieved. Moreover, it is conceivable that, in addition or as an alternative to a communication with the central database, there is a communication, in particular a data exchange, with at least one sensor unit of work clothing, in particular personal protection equipment (PPE), that an operator and/or user is wearing. Consequently, a safety function of the portable power tool can be advantageously further enhanced. Particularly advantageously, a dependable detection of hazardous situations can be made possible as a result of an indication, an active warning, a disabling of the portable power tool or the like. Consequently, an operator of the portable power tool can be advantageously protected from dangers and/or from injuries.

The open-loop and/or closed-loop control unit is advantageously intended for controlling the drive unit in an open-loop and/or closed-loop manner at least in dependence on at least one ambient characteristic variable recorded by means of the ambient sensor unit formed as an emission characteristic variable of the power tool. For this purpose, the ambient sensor unit preferably comprises at least one ambient sensor element, which is intended for recording, in particular optically recording, a development of dust. A maximum admissible dust generation characteristic variable may be stored here in a network, in particular an internal company network, Internet network etc., which the power tool device accesses by means of the communication unit, or in a memory unit of the open-loop and/or closed-loop control unit. The open-loop and/or closed-loop control unit compares a recorded emission characteristic variable of the power tool with a maximum admissible dust generation characteristic variable stored in the network or in the memory unit. It is conceivable here that a suction power of a dust extractor is controlled in an open-loop and/or closed-loop manner so as to correspond to the recorded emission characteristic variable of the power tool. Moreover, at least the drive unit is controlled in an open-loop and/or closed-loop manner in dependence on the recorded emission characteristic variable of the power tool. Furthermore, an item of information, such as for example a suggestion to use a stronger dust extractor or a suggestion to change the filter or the like, can be output by means of the information output unit in dependence on the emission characteristic variable recorded. Here, the ambient sensor element may also be a component part of an external sensor unit, which exchanges electronic data with the power tool device by means of a communication unit of the power tool device. Moreover, the ambient sensor unit comprises at least one ambient sensor element, which is intended for recording a global position of the power tool device. The ambient sensor unit further comprises at least one ambient sensor element, which is intended for recording a noise emission of the power tool. Preferably, as a result of an adjustment of the recorded global position with data stored in a memory unit of the open-loop and/or closed-loop control unit, it can be detected whether the power tool device is in a noise-sensitive area. Here, the open-loop and/or closed-loop control unit controls the drive unit in an open-loop and/or closed-loop manner in dependence on the recorded noise emission. Here, for example, a maximum drive unit rotational speed, an impact frequency, an impact energy or the like is reduced to a predefined value in order not to exceed a noise limit value. Alternatively, the noise emission, in particular a structure-borne sound, can be recorded by means of an external sensor unit. By means of the configuration according to the disclosure, an admissible dust extraction can be advantageously ensured. Moreover, an operator can be advantageously protected from health hazards caused by breathing in large amounts of dust. Furthermore, a low level of noise nuisance for outsiders can be advantageously achieved.

It is further proposed that the open-loop and/or closed-loop control unit is intended for determining a machining tool position of a machining tool arranged on a tool holder of the power tool at least in dependence on at least one drive unit characteristic variable recorded by means of the drive unit sensor unit. Here, for example, a position of an armature of the drive unit is recorded by means of a position sensor element of the drive unit sensor unit. Consequently, a machining tool can be advantageously stopped in a desired position. A high level of operating convenience can be advantageously made possible.

The power tool device advantageously comprises at least one working area lighting unit, which can be controlled by the open-loop and/or closed-loop control unit in an open-loop and/or closed-loop manner in dependence on at least one ambient characteristic variable recorded by means of the ambient sensor unit. For this purpose, the ambient sensor unit preferably comprises at least one ambient light sensor element, which is intended for recording at least one light characteristic variable, such as for example a brightness, an area of illumination, an intensity or the like. According to the disclosure, an illumination of a working area and/or a brightness of a working area is preferably recorded by the ambient light sensor element. The working area lighting unit can preferably be controlled here by means of the open-loop and/or closed-loop control unit in an open-loop and/or closed-loop manner to a preset lighting value (user-specific/ as stipulated by an employer/stored in a database for a working area) in dependence on the recorded illumination of the working area and/or the brightness of the working area. It is however also conceivable that an external sensor unit is provided, communicating with the open-loop and/or closed-loop control unit by means of the communication unit for providing an open-loop and/or closed-loop control of the working area lighting unit. Consequently, the working area lighting unit can be advantageously adapted to a brightness of the ambient surroundings, so that the working area is lit equally brightly under changing brightness of the ambient surroundings.

Furthermore, it is proposed that the power tool device comprises at least one machining tool sensor unit for recording at least one machining tool characteristic variable, which can be processed by the open-loop and/or closed-loop control unit at least for providing an open-loop and/or closed-loop control of the drive unit and/or for outputting information to an operator. The machining tool sensor unit is preferably intended for recording at least one machining tool characteristic variable of a machining tool arranged in a tool holder. The tool holder is preferably a component part of a power tool comprising the power tool device. It is however also conceivable that the tool holder is a component part of the power tool device. The machining tool characteristic variable may be formed here as a machining tool mass, as a machining tool dimension, as a machining tool vibration, as a machining tool speed, as a machining tool rotational speed, as a machining tool inertia, as a machining tool type, as a machining tool temperature, as a machining tool degree of contamination, as a machining tool cutting edge wear, as a machining tool position, in particular as a machining tool position within a tool holder, or as some other machining tool characteristic variable that appears appropriate to a person skilled in the art. The machining tool sensor unit comprises at least one machining tool sensor element for recording the at least one machining tool characteristic variable. The machining tool sensor element may be formed here as a machining tool mass sensor, as a machining tool dimension sensor, as a machining tool vibration sensor, as a machining tool speed sensor, as a machining tool rotational speed sensor, as a machining tool inertia sensor, as a machining tool type sensor, as a machining tool temperature sensor, as a machining tool degree of contamination sensor, as a machining tool cutting edge wear sensor or some other machining tool sensor element that appears appropriate to a person skilled in the art.

Preferably, at least when running up the drive unit to an idling speed, at least one drive unit characteristic variable and/or at least one machining tool characteristic variable can be determined by means of the open-loop and/or closed-loop control unit. Vibrations of a machining tool can preferably be recorded here by means of at least one machining tool sensor element, which is formed as an acceleration sensor, wherein the recorded signals can be evaluated by means of the open-loop and/or closed-loop control unit. Moreover, a machining tool characteristic variable that can be processed by the open-loop and/or closed-loop control unit for providing a determination of a machining tool dimension can preferably be recorded by means of at least one further machining tool sensor element, which is formed as an optical sensor (camera, infrared sensor etc.) or as a distance sensor. Moreover, a motor current can preferably be recorded by means of a drive unit sensor element during running up of the drive unit to an idling speed, which can be processed by means of the open-loop and/or closed-loop control unit for providing a determination of an inertia of a machining tool. Furthermore, a machining tool type of a machining tool can be determined by means of the open-loop and/or closed-loop control unit by means of at least one recorded machining tool characteristic variable, wherein parameters can be changed machining-tool-specifically for providing an open-loop and/or closed-loop control of the drive unit, such as for example a setting of a rotational speed for stainless steel applications when a stainless steel machining tool is detected on a portable power tool formed as an angle grinder, a soft start when a polishing machining tool is detected or activation of a deceleration function of a portable power tool when a cutting machining tool is detected, such as for example a cutting disk in the case of a portable power tool formed as an angle grinder. In addition to recording at least one machining tool characteristic variable by means of the machining tool sensor unit, a transmission of at least one machining tool characteristic variable by means of an RFID, a barcode, a data matrix code or the like is also conceivable. This advantageously allows there to be a clear identification of a machining tool type, for which there are stored in the memory unit of the open-loop and/or closed-loop control unit machining-tool-specific parameters, which as a result of a recording of at least one machining tool characteristic variable by the machining tool sensor unit can be adapted by means of the open-loop and/or closed-loop control unit, such as for example to a degree of wear, to a degree of imbalance etc.

Electronic data exchange between the open-loop and/or closed-loop control unit and the drive unit sensor unit and/or the machining tool sensor unit preferably takes place in a wire-bound manner. In an alternative configuration of the power tool device, an electronic data exchange between the open-loop and/or closed-loop control unit and the drive unit sensor unit and/or the machining tool sensor unit takes place in a cableless manner, such as for example by means of a Bluetooth connection, by means of a WLAN connection, by means of an NFC connection, by means of an infrared connection or the like. The open-loop and/or closed-loop control unit controls the drive unit in an open-loop and/or closed-loop manner particularly preferably at least in dependence on the drive unit characteristic variable recorded by means of the drive unit sensor unit and in dependence on the machining tool characteristic variable recorded by means of the machining tool sensor unit.

Further characteristic variables that appear appropriate to a person skilled in the art and for which allowance can be made by the open-loop and/or closed-loop control unit for providing an open-loop and/or closed-loop control of the drive unit are likewise conceivable.

By means of the configuration of the power tool device according to the disclosure, damage to a machining tool can be advantageously detected, in particular before a workpiece is machined with the machining tool. For example, vibrations can be advantageously recorded and a corresponding warning issued to an operator if the vibrations exceed a critical value and/or an open-loop and/or closed-loop control of the drive unit can be adapted to a damaged machining tool. Consequently, a risk of an operator being injured can be advantageously kept down. Moreover, inadmissibly or incorrectly mounted machining tools can be advantageously detected. Consequently, an operator can for example be advantageously informed at an early time of a risk of breaking of a machining tool. A high level of operator safety can therefore be advantageously achieved.

It is further proposed that the power tool device comprises at least one actuator unit for actuation and/or arrestment of a tool holder of the power tool at least in dependence on the at least one machining tool characteristic variable recorded by means of the machining tool sensor unit. Preferably recorded here by means of the machining tool sensor unit is a machining tool characteristic variable that is formed as a machining tool position and can be processed by the open-loop and/or closed-loop control unit for providing an open-loop and/or closed-loop control of the actuator unit. By means of the configuration according to the disclosure, convenient operability of the power tool comprising the power tool device can be advantageously achieved. Consequently, a high level of operating convenience can be advantageously achieved.

It is proposed moreover that the power tool device comprises at least one workpiece sensor unit for recording at least one workpiece characteristic variable, which can be processed by the open-loop and/or closed-loop control unit at least for providing an open-loop and/or closed-loop control of the drive unit and/or for providing an output of information to an operator. The workpiece sensor unit is preferably intended for recording at least one material of a workpiece. Moreover, the workpiece sensor unit is additionally or alternatively intended for recording a density of a workpiece, a distance of a workpiece relative to a machining tool arranged in a tool holder, a dimension of a workpiece, a position of a workpiece and/or further workpiece characteristic variables that appear appropriate to a person skilled in the art. Consequently, an open-loop and/or closed-loop control of a drive unit that is advantageously made to match a workpiece to be machined and a machining tool arranged in a tool holder can advantageously take place. As a result, precise machining of a workpiece can be advantageously made possible. Moreover, a high rate of work progress can be advantageously made possible. As a result of a recording of at least one workpiece characteristic variable, a behavior during machining of the workpiece can be advantageously inferred. Consequently, a high level of safety with regard to the risk of splintering when machining a workpiece can be advantageously achieved.

Furthermore, it is proposed that the power tool device comprises at least one power tool accessory sensor unit for recording at least one power tool accessory characteristic variable, which can be processed by the open-loop and/or closed-loop control unit at least for providing an open-loop and/or closed-loop control of the drive unit and/or for providing an output of information to an operator. A "power tool accessory sensor unit" is to be understood as meaning in particular here a sensor unit which records a characteristic variable of at least one power tool accessory that can be attached to a power tool comprising the power tool device. The power tool accessory characteristic variable may be formed here as an accessory state characteristic variable, such as for example a mounted state characteristic variable of an accessory, as a wear state characteristic variable, as an accessory position characteristic variable, as an accessory function characteristic variable, as an accessory dimension characteristic variable or the like. Consequently, allowance can be advantageously made for a mounted accessory in an open-loop and/or closed-loop control of the drive unit by means of the open-loop and/or closed-loop control unit. For example, in the event of an incorrect, defective and/or worn accessory, an output of information to an operator can advantageously take place and/or an open-loop and/or closed-loop control parameter, such as for example a rotational speed, a power supply, a voltage supply or the like, can be advantageously adapted.

Furthermore, a power tool, in particular a portable power tool with a power tool device according to the disclosure, is proposed. Particularly preferably, the power tool is formed as a portable power tool. A "portable power tool" is to be understood as meaning in particular here a power tool for machining workpieces that can be transported by an operator without a transporting machine. The portable power tool has in particular a mass that is less than 40 kg, preferably less than 10 kg and particularly preferably less than 5 kg. The portable power tool is preferably formed here as an angle grinder. In an alternative configuration, the portable power tool is formed as a hammer drill and/or a chipping hammer. In a further alternative configuration, the portable power tool is formed as a jigsaw. It is however also conceivable that the portable power tool has some other configuration that appears appropriate to a person skilled in the art, such as for example a configuration as a battery-operated power screwdriver, as an impact drill, as a grinder, as a circular saw, as a diamond drill, as a chainsaw, as a saber saw, as a planer, as a garden tool or the like. By means of the configuration of the power tool according to the disclosure, an advantageous adaptation to conditions of use can be made possible. Moreover, machining of a workpiece that is set individually to an operator can be advantageously made possible. Consequently, precise, power-optimized machining of a workpiece can be advantageously made possible. Moreover, a high level of safety of an operator during machining of a workpiece can be advantageously ensured. Furthermore, a high level of operator convenience can be advantageously achieved.

Furthermore, a power tool system with at least one power tool according to the disclosure and with at least one external unit, in particular an external sensor unit, is proposed. In one configuration of the power tool system, the external unit is preferably formed as an external noise emission sensor unit. It is possible to obtain a noise measurement, by means of which for example a by lowering of the rotational speed of the drive unit takes place when a prescribed noise limit value is exceeded. The external unit may be formed here for example as a smartphone. Moreover, in an alternative configuration of the power tool system, the external unit is formed as an external flying spark recording unit. Consequently, a maximum distance that sparks fly can be advantageously set in dependence on a recorded instance of flying sparks, in that a rotational speed of the drive unit can be controlled by the open-loop and/or closed-loop control unit in a closed-loop manner to a maximum flying distance of the sparks in dependence on a machining tool, a material and/or an application case. For this purpose, the instance of flying sparks can for example be optically recorded and the rotational speed can be adapted for altering a distance that sparks fly. Consequently, noise-related nuisances and/or damaging effects are advantageously avoidable and/or reducible.

Moreover, a method for controlling at least one power tool according to the disclosure, in particular a portable power tool, in an open-loop and/or closed-loop manner is provided, wherein the open-loop and/or closed-loop control unit determines at least one ambient influence by the power tool and makes allowance for the ambient influence by the power tool at least for providing an open-loop and/or closed-loop control of the drive unit of the power tool. Consequently, an adaptation of operating parameters in dependence on ambient surroundings can be advantageously achieved. Compliance with emission limits can be advantageously made possible. By means of the method according to the disclosure, an at least substantially automatic setting of operating parameters and/or operating modes of a power tool can be advantageously made possible.

It is further proposed that the method comprises at least one method step in which the open-loop and/or closed-loop control unit in at least one operating mode at least partially automatically opens and/or closes a tool holder of the power tool. A high level of operating convenience can be advantageously realized. Moreover, the possibility of a one-handed tool change can be advantageously made available.

Moreover, it is proposed that, in particular in at least one operating mode of the portable power tool, the open-loop and/or closed-loop control unit accesses at least partially automatically by means of the communication unit the central database, in which there is stored at least one safety and/or operating area rule, which can be processed by the open-loop and/or closed-loop control unit at least for providing an open-loop and/or closed-loop control of the drive unit. The open-loop and/or closed-loop control unit preferably evaluates the safety and/or operating area rules stored in the central database automatically and interprets the safety and/or operating area rules automatically for providing an open-loop and/or closed-loop control of the portable power tool. Particularly preferably, in addition to access to the central database by means of the communication unit, electronic data can be exchanged with at least one external unit by means of the communication unit. Consequently, a data exchange between the portable power tool comprising the power tool device and further external units can preferably take place, such as for example a data exchange between the portable power tool comprising the power tool device and a sensor unit of work clothing, a smartphone, a laptop, a PC, a handheld device, a tablet, a server or the like. In particular, the characteristic variables recorded by means of the sensor units of the power tool device and/or the data transmitted by means of the communication unit are preferably exchangeable here and/or can be used for providing an open-loop and/or closed-loop control of the portable power tool comprising the power tool device. The communication unit may have and/or use here cable-bound and/or cableless interfaces and/or communication protocols. Interfaces and/or communication protocols may be formed for example as a USB, as a Canbus, as an Ethernet, in particular with a twisted pair of cables (CAT5 or CAT6), as an optical transmission medium, as a KNX, as a Powerline, as an NFC (near field communication), as an RFID (near field communication), as a Zigbee (near field communication), as a Bluetooth, in particular to the standard 4.0 Low Energy (short range), as a WLAN, in particular to the standard 801.11n (medium range), as a GSM or an LTE (mobile radio network), in particular for long ranges, or the like. Preferably, an external unit, in particular a smartphone, is formed as a router, which is intended as a switching location at least between the communication unit of the power tool device and the central database and/or a further external unit. An individually adapted company smartphone should advantageously be used here. By means of the configuration according to the disclosure, allowance for safety and/or operating area rules can be advantageously made at least partially automatically for providing an open-loop and/or closed-loop control at least of the drive unit. Consequently, a high level of operating convenience and dependable compliance with safety functions can be advantageously ensured.

Furthermore, it is proposed that the open-loop and/or closed-loop control unit uses data recorded by the power tool sensor and/or data transmitted by the communication unit at least for providing an open-loop and/or closed-loop control of the drive unit. The data recorded by the power tool sensor that can be used by the open-loop and/or closed-loop control unit for providing an open-loop and/or closed-loop control of the drive unit can preferably be recorded by means of at least one of the sensor units, in particular by means of all of the sensor units, of the power tool device. Preferably, the data that are transmitted by the communication unit can be transmitted by means of the communication unit to the open-loop and/or closed-loop control unit from an external unit and/or from the central database. It is conceivable here that the data transmitted by the communication unit can be recorded for example by means of at least one sensor unit of work clothing and can be received by means of the communication unit and/or can be directly read out from the central database by means of the communication unit. The sensor units of the power tool device and/or of the external unit preferably comprise in each case at least one sensor element for recording at least one characteristic variable. The sensor element may be formed here for example as a position sensor (magnetic field sensor or the like, for recording the spatial position), as a movement sensor (speed sensor, acceleration sensor, rate of rotation sensor or the like), as a GPS sensor (X, Y, Z on the Earth's surface), as a pressure sensor (strain gage or the like), as a gas sensor ($CO_2$ sensor; carbon monoxide sensor or the like), as a temperature sensor, as a voltage sensor, as a moisture sensor, as a pH sensor, as an air pressure sensor (barometer), as a pulse sensor or the like. By means of the configuration according to the disclosure, an allowance for location-dependent safety and/or operating area rules can be advantageously made and, moreover, an inclusion of data recorded by the power tool sensor and/or data transmitted by the communication unit can be used for providing an open-loop and/or closed-loop control of the portable power tool. Consequently, a high level of work safety can be advantageously ensured.

It is further proposed that the open-loop and/or closed-loop control unit outputs at least one item of information by means of an information output unit in dependence on data recorded by the power tool sensor and/or data transmitted by the communication unit. Consequently, information can be advantageously output to an operator in order for example to inform the operator about access control to an area of the infrastructure. Consequently, access control to an area of the infrastructure can be advantageously realized. It is conceivable here that for example fire prevention rules stored in the central database have the effect that an operator may only work with a specific portable power tool in defined rooms with approval or when accompanied by a member of the works fire service. Moreover, it is advantageously possible to warn persons at risk in ambient surroundings and/or in direct proximity of the place of use of the portable power tool by means of optical and/or acoustic signals.

Moreover, it is proposed that the open-loop and/or closed-loop control unit controls at least one operating mode setting of the power tool in an open-loop and/or closed-loop manner in dependence on data recorded by the power tool sensor and/or data transmitted by the communication unit. Consequently, optimum operation of the portable power tool comprising the power tool device can be advantageously achieved.

The open-loop and/or closed-loop control unit interprets, combines and/or evaluates preferably the data recorded by the power tool sensor and/or the data transmitted by the communication unit for providing an open-loop and/or closed-loop control of the portable power tool comprising the power tool device. By means of a transmission of data to the central database, it is preferably conceivable that work reports of jobs can be created at least partially automatically and that these can be recorded and/or logged by facility management staff. In this way it can be advantageously documented who worked with what type of portable power tool when, for how long and at which location. If an incident and/or an accident happens, an automatically created log can thus be advantageously used later to demonstrate observance of an obligation to take care.

As a result of establishing risk potentials, safety and/or operating area rules or the like by the health and safety engineers (HSE) and/or the facility management (FCM) for rooms, laboratories or workshops of the infrastructure, corresponding electronic data are stored in the central database. The communication of the portable power tool comprising the power tool device with the central database means that it can be identified, for example by means of locating by GPS coordinates, which portable power tool is to be found where within the infrastructure. In particular in the case of additional operator data transmission, it can in particular be recorded which operator, in particular with what level of training, is located where with which type of portable power tool. In this way it can be recorded if a portable power tool is taken into an area of the infrastructure that is unauthorized for this portable power tool and operation of the portable power tool can be disabled, information can be output to an operator and/or this can be reported to the health and safety engineers (HSE) and/or the facility management (FCM). Consequently, access monitoring can advantageously take place. It can be advantageously monitored and/or checked in which areas of the infrastructure a portable power tool may be used and whether an operator has to present evidence of permission for use. Consequently, a monitoring of rules can advantageously take place with regard to unaccompanied work and/or automatic one-man monitoring can take place by at least one sensor element of the work clothing in combination with sensor units of the power tool device.

It is also conceivable that electronic data which define limit values for ambient conditions, such as for example temperature limit values, air and/or gas concentration values, are stored in the central database by for example a health and safety engineer (HSE) and/or the facility management (FCM). As a result of a transmission of the electronic data from the central database and a transmission of data recorded by the power tool sensor to the central database, monitoring and/or demonstration of compliance with limit values is advantageously possible.

It is conceivable furthermore that an adjustment of a permission for use takes place by means of the electronic data transmitted by the communication unit. Here it is conceivable for example for training and/or instruction of the operator to be demonstrated by an input (chip card, RFID chip or the like) or by an adjustment of an operator identification profile stored in the central database, in order to make it possible for the portable power tool to be put into operation. If it has been put into operation without authorization having been properly demonstrated, the portable power tool can for example be disabled or for example a warning can be issued by means of the information output unit or a central control station can be informed.

Moreover, it is also conceivable that data of the portable power tool, such as for example the running time, vibrations, rechargeable battery capacity, cooling unit power, motor power or the like, can be transmitted by means of the communication unit to an operator-side unit, such as for example a user interface, a wristwatch, a smartphone, data goggles or the like. The data of the portable power tool can also be transmitted to the central database in order for example to be able to monitor compliance with limit values. Moreover, for example, employees of an outside company who are within the infrastructure can be monitored. Consequently, for example, a working time and/or a working location of the employees of the outside company can be logged. Furthermore, it is possible by means of a transmission of electronic data by means of the communication unit preferably for an operator profile to be set up by the open-loop and/or closed-loop control unit. When there is a transmission of data by means of the communication unit, settings of the portable power tool can preferably be performed here automatically by the open-loop and/or closed-loop control unit, such as for example authorization settings, the setting of a preferred motor characteristic curve, the setting of a response behavior of safety functions (kickback function etc.) or the like.

Furthermore, in particular as a result of an adjustment of electronic data from the central database, of data recorded by the power tool sensor and of data recorded by means of at least one sensor unit of an operator's work clothing, automatic monitoring of an obligation to wear personal protective equipment (PPE), which for example comprises a helmet, at least one glove, at least one pair of protective goggles, safety shoes, work pants or the like, and/or monitoring of a restriction of the locations where a portable power tool can be used can be achieved. Here it is conceivable that an emergency switch-off of the portable power tool can be instigated by a central control station in an area of the infrastructure as soon as at least one vital characteristic variable of an operator reaches a value that is critical for an operator.

Moreover, a central update function for the portable power tool can be advantageously made possible by means of a transmission of electronic data from a central database. Furthermore, when maintenance is due, such as for example a change of carbon brushes, can be advantageously transmitted to a central control station.

The power tool device according to the disclosure, the power tool according to the disclosure and/or the method according to the disclosure is/are not to be restricted here to the application and embodiment described above. In particular, the power tool device according to the disclosure, the power tool according to the disclosure and/or the method according to the disclosure may have a number of individual elements, components, units and/or method steps other than the number mentioned herein for achieving a manner of functioning described herein.

BRIEF DESCRIPTION OF THE DRAWINGS

Further advantages emerge from the following description of the drawing. In the drawing, exemplary embodiments of the disclosure are represented. The drawing, the description and the claims contain numerous features in combination. A person skilled in the art will expediently also consider the features individually and bring them together into further appropriate combinations.

In the drawing.

DETAILED DESCRIPTION

Figure 1:
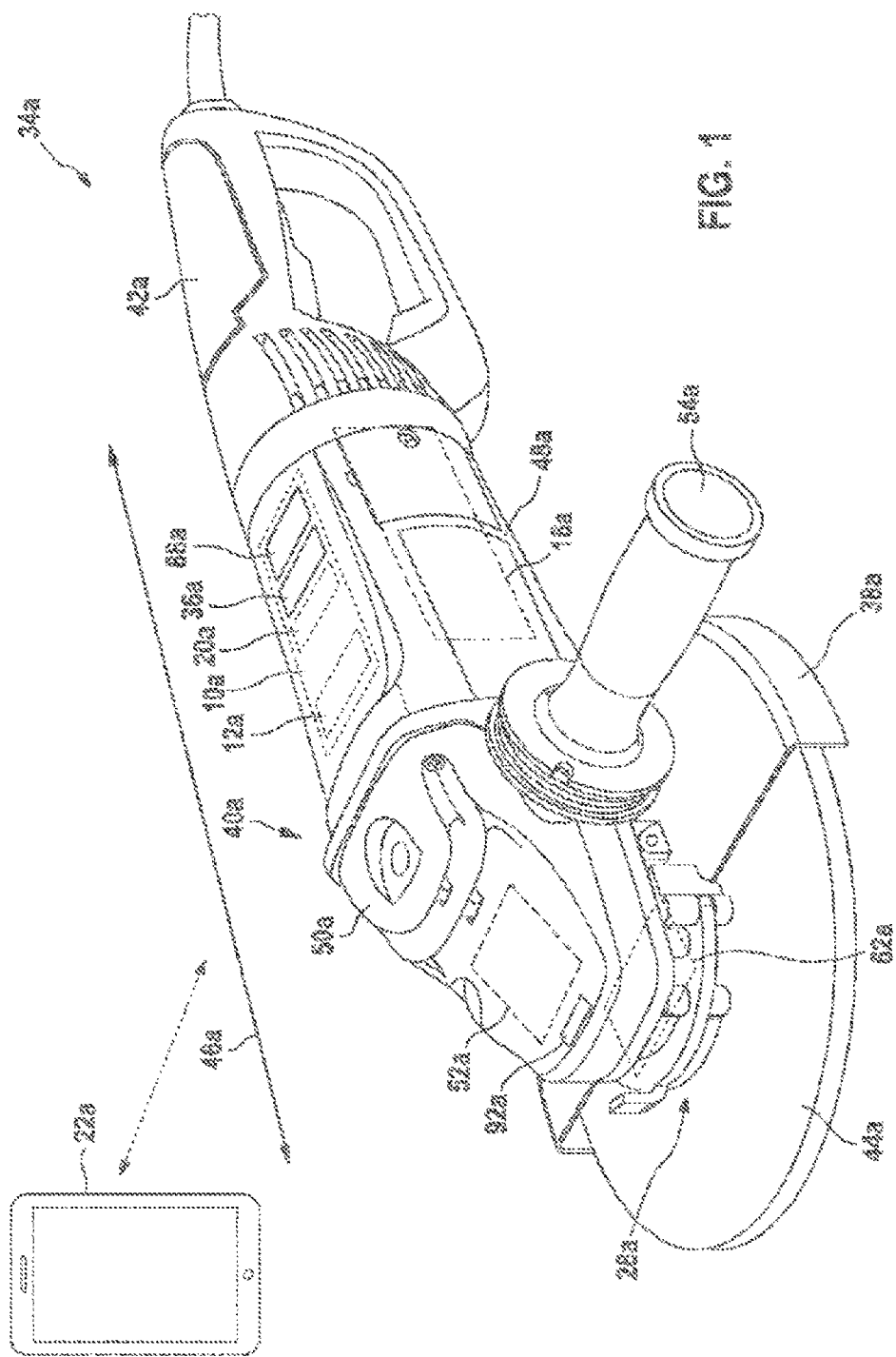
FIG. 1 shows a power tool according to the disclosure, which is formed as an angle grinder, with at least one power tool device according to the disclosure in a schematic representation.

FIG. 1 shows a power tool 34a with at least one power tool device 10a. The power tool 34a is formed as a portable power tool. Here, the power tool 34a is formed as an angle grinder. Consequently, the power tool 34a comprises at least one power tool accessory unit 38a, formed as a protective shroud unit. The power tool 34a also comprises at least one power tool housing 40a and a main handle 42a, which extends on a side of the power tool housing 40a that is facing away from a machining tool 44a in the direction of a main direction of extent 46a of the power tool 34a. The machining tool 44a is formed here as a grinding disk. It is however also conceivable that the machining tool 44a is formed as a cutting or polishing disk. The power tool housing 40a comprises a motor housing 48a for receiving a drive unit 16a of the power tool 34a. The power tool housing 40a further comprises a transmission housing 50a for receiving an output unit 52a of the power tool 34a. The drive unit 16a is intended for driving the machining tool 44a in a rotational manner by way of the output unit 52a. Arranged on the transmission housing 50a is a further power tool accessory unit 54a, formed as an additional handle unit. The power tool accessory unit 54a formed as an additional handle unit extends transversely in relation to the main direction of extent 46a of the power tool 34a.

Figure 2:
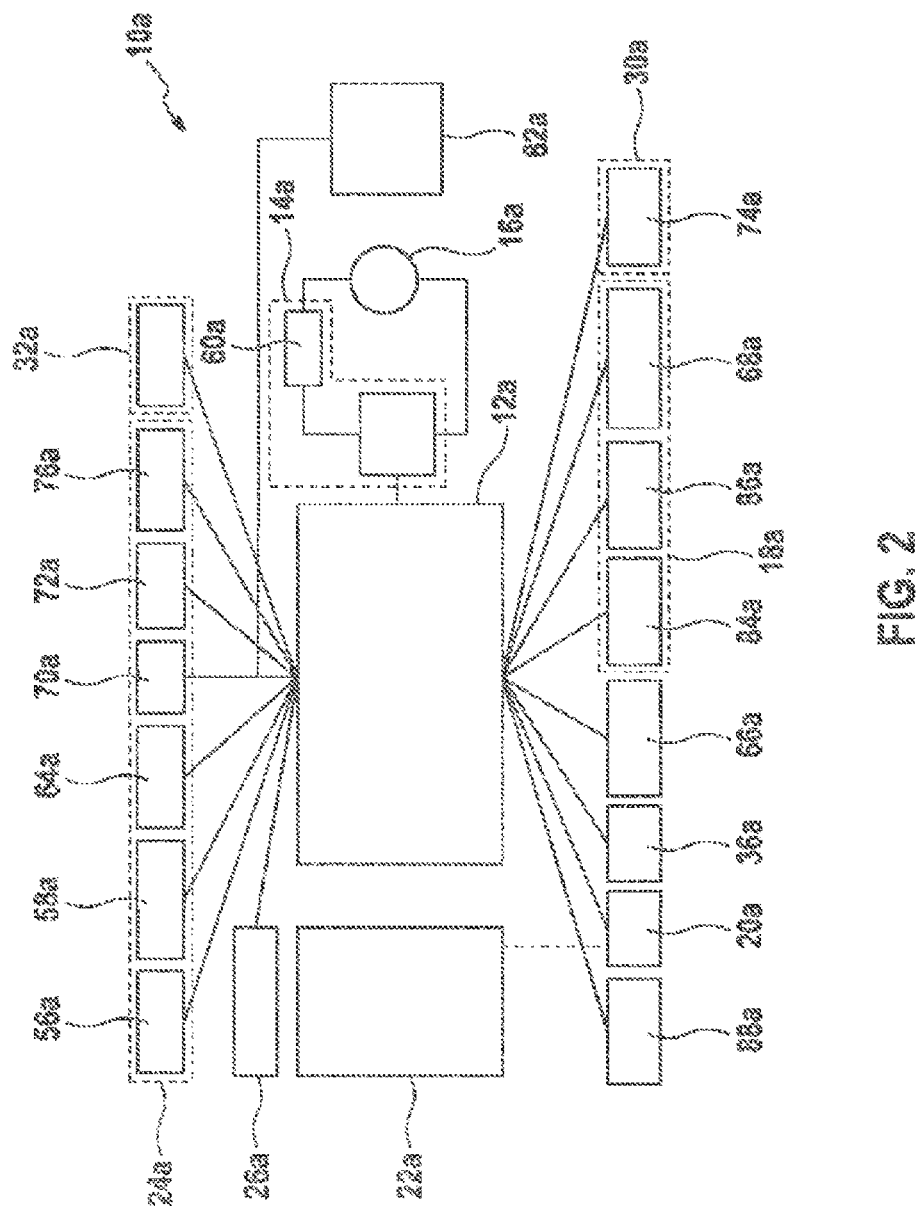
FIG. 2 shows a schematic representation of the power tool device according to the disclosure.

The power tool device 10a is formed as a handheld power tool device. The power tool device 10a preferably comprises a power supply device 82a (FIG. 2). Consequently, the power tool device 10a can be operated independently of a power supply of the power tool 34a. It is however also conceivable that, in an alternative configuration of the power tool device 10a, the power tool device 10a can be supplied with power by means of a power supply device of the power tool 34a. The power tool device 10a further comprises at least one open-loop and/or closed-loop control unit 12a and at least one drive unit sensor unit 14a for recording at least one drive unit characteristic variable, which can be processed by the open-loop and/or closed-loop control unit 12a for at least providing an open-loop and/or closed-loop control of a drive unit 16a of the power tool 34a and/or for providing an output of information to an operator. In at least one operating mode of the power tool 34a, the open-loop and/or closed-loop control unit 12a is intended for providing an open-loop and/or closed-loop control of the drive unit 16a in dependence on the at least one drive unit characteristic variable recorded by means of the drive unit sensor unit 14a.

Furthermore, the power tool device 10a comprises at least one ambient sensor unit 18a for recording at least one ambient characteristic variable, which can be processed by the open-loop and/or closed-loop control unit 12a at least for providing an open-loop and/or closed-loop control of the drive unit 16a and/or for providing an output of information to an operator. The open-loop and/or closed-loop control unit 12a is intended for providing an open-loop and/or closed-loop control of the drive unit 16a in dependence on the at least one ambient characteristic variable recorded by means of the ambient sensor unit 18a and in dependence on the at least one drive unit characteristic variable recorded by means of the drive unit sensor unit 14a. The ambient sensor unit 18a comprises here at least one position sensor 84a, which records a spatial alignment of the power tool 34a. The position sensor 84a is preferably formed as a three-axis movement sensor. It is however also conceivable that the position sensor 84a has some other configuration that appears appropriate to a person skilled in the art. Moreover, the ambient sensor unit 18*a* has at least one location determination sensor 86*a*, which records a global position of the power tool 34*a*. The location determination sensor 86*a* is preferably formed as a GPS sensor. It is however also conceivable that the location determination sensor 86*a* has some other configuration that appears appropriate to a person skilled in the art. The ambient sensor unit 18*a* further has at least one emission sensor element 68*a*, which is intended for recording emissions of the power tool 34*a*. Here, the emission sensor element 68*a* is intended for recording noise emissions of the power tool 34*a*. It is however also conceivable that the emission sensor element 68*a* is intended for recording other emissions of the power tool 34*a* that appear appropriate to a person skilled in the art, such as for example an electromagnetic radiation, dust, sparks or odors, fluidic pollutants and/or solid pollutants. Consequently, the open-loop and/or closed-loop control unit 12*a* is intended for controlling the drive unit 16*a* in an open-loop and/or closed-loop manner at least in dependence on at least one ambient characteristic variable recorded by means of the ambient sensor unit 18*a* and formed as an emission characteristic variable of the power tool 34*a*.

The power tool device 10*a* further comprises at least one communication unit 20*a* for communication with at least one external unit 22*a* for an exchange of electronic data at least for providing an open-loop and/or closed-loop control of the drive unit 16*a*. The external unit 22*a* comprises here at least one sound sensor element (not represented any more specifically here), which is intended for recording a sound characteristic variable of the power tool 34*a*. The external unit 22*a* can be arranged here at a distance from the power tool 34*a* for recording a sound characteristic variable of the power tool 34*a*. Consequently, a sound characteristic variable of the power tool 34*a* that is at a distance from a direct machining location of the power tool 34*a* can be recorded. The open-loop and/or closed-loop control unit 12*a* is intended here to make allowance at least in dependence on the sound characteristic variable of the power tool 34*a* received by means of the communication unit 20*a* and recorded by the external unit 22*a*, for providing an open-loop and/or closed-loop control of the drive unit 16*a*. Consequently, the open-loop and/or closed-loop control unit 12*a* determines in at least one operating mode of the power tool 34*a* at least one ambient influence by the power tool 34*a* and makes allowance for the ambient influence by the power tool 34*a* at least for providing an open-loop and/or closed-loop control of the drive unit 16*a* of the power tool 34*a*. The communication unit 20*a* is intended moreover for communicating with a location network arranged at a machining location. Electronic data that assign an emission limit to locations, for example on a company's premises, can be transmitted here to the open-loop and/or closed-loop control unit 12*a*. The open-loop and/or closed-loop control unit 12*a* is intended for evaluating the electronic data that assign an emission limit to locations and for actively modifying an emission characteristic variable of the power tool 34*a*, such as for example a tool noise etc., at least in dependence on a global position of the power tool 34*a* determined by means of the location determination sensor 86*a*. It is conceivable moreover that the open-loop and/or closed-loop control unit 12*a* makes allowance here for further characteristic variables, such as for example the sound characteristic variables of the power tool 34*a* recorded by means of the external unit 22*a*, the noise emissions of the power tool 34*a* recorded by means of the emission sensor element 68*a* etc. Moreover, it is conceivable that, at least in an emission operating mode of the power tool 34*a*, the open-loop and/or closed-loop control unit 12*a* is intended for damping noise emissions of the power tool 34*a* as a result of generating conteracting sound by means of an external counteracting sound unit that can be activated by way of the communication unit 20*a*. Moreover, it is conceivable that, in at least an emission operating mode of the power tool 34*a*, the open-loop and/or closed-loop control unit 12*a* is intended for reducing a rotational speed of the drive unit 16*a* and/or for overlaying an additional movement on a rotational movement of the drive unit 16*a*, which reduces noises etc. Further configurations for limiting emissions that appear appropriate to a person skilled in the art are likewise conceivable.

Furthermore, the open-loop and/or closed-loop control unit 12*a* is intended for accessing by means of the communication unit 20*a* a central database, in which there is stored at least one safety and/or operating area rule, which can be processed by the open-loop and/or closed-loop control unit 12*a* at least for providing an open-loop and/or closed-loop control of the drive unit 16*a*. Here, in at least one operating mode, the open-loop and/or closed-loop control unit 12*a* accesses at least partially automatically by means of the communication unit 20*a* the central database, in which there is stored at least one safety and/or operating area rule that can be processed by the open-loop and/or closed-loop control unit 12*a* at least for providing an open-loop and/or closed-loop control of the drive unit 16*a*. Consequently, the open-loop and/or closed-loop control unit 12*a* uses data recorded by the power tool sensor and/or data transmitted by the communication unit at least for providing an open-loop and/or closed-loop control of the drive unit 16*a*. Furthermore, the open-loop and/or closed-loop control unit 12*a* outputs at least one item of information by means of an information output unit 36*a* of the power tool device 10*a* in dependence on data recorded by the power tool sensor and/or data transmitted by the communication unit, in particular for informing an operator about a state of the power tool and/or for warning that there is a risk. Moreover, the open-loop and/or closed-loop control unit 12*a* controls at least one operating mode setting of the power tool in an open-loop and/or closed-loop manner in dependence on data transmitted by the communication unit.

By means of the ambient sensor unit 18*a*, moreover, flying sparks that occur when machining a workpiece can be recorded. In dependence on flying spark characteristic variables recorded by means of the ambient sensor unit 18*a*, the drive unit 16*a* can be controlled by means of the open-loop and/or closed-loop control unit 12*a* in an open-loop and/or closed-loop manner. The flying spark characteristic variable can be recorded here for example by means of an optical sensor element of the ambient sensor unit 18*a* and/or by means of some other sensor element of the ambient sensor unit 18*a* that appears appropriate to a person skilled in the art.

Furthermore, the power tool device 10*a* comprises at least one power tool accessory sensor unit 32*a* for recording at least one power tool accessory characteristic variable, which can be processed by the open-loop and/or closed-loop control unit 12*a* at least for providing an open-loop and/or closed-loop control of the drive unit 16*a* and/or for providing an output of information to an operator. In at least one operating mode of the power tool 34*a*, the open-loop and/or closed-loop control unit 12*a* is intended for providing an open-loop and/or closed-loop control of the drive unit 16*a* in dependence on the at least one drive unit characteristic variable recorded by means of the drive unit sensor unit 14*a*, in dependence on the at least one ambient characteristic variable recorded by means of the ambient sensor unit 18*a* and in dependence on the at least one power tool accessory characteristic variable recorded by means of the power tool accessory sensor unit 32*a*.

Furthermore, the open-loop and/or closed-loop control unit 12*a* is intended for accessing by means of the communication unit 20*a* a central database, in which there is stored at least one safety and/or operating area rule, which can be processed by the open-loop and/or closed-loop control unit 12*a* at least for providing an open-loop and/or closed-loop control of the drive unit 16*a*. Here, in at least one operating mode, the open-loop and/or closed-loop control unit 12*a* accesses at least partially automatically by means of the communication unit 20*a* the central database, in which there is stored at least one safety and/or operating area rule that can be processed by the open-loop and/or closed-loop control unit 12*a* at least for providing an open-loop and/or closed-loop control of the drive unit 16*a*. Consequently, the open-loop and/or closed-loop control unit 12*a* uses data recorded by the power tool sensor and/or data transmitted by the communication unit at least for providing an open-loop and/or closed-loop control of the drive unit 16*a*. Furthermore, the open-loop and/or closed-loop control unit 12*a* outputs at least one item of information by means of an information output unit 36*a* of the power tool device 10*a* in dependence on data recorded by the power tool sensor and/or data transmitted by the communication unit, in particular for informing an operator about a state of the power tool and/or for warning that there is a risk. Moreover, the open-loop and/or closed-loop control unit 12*a* controls at least one operating mode setting of the power tool in an open-loop and/or closed-loop manner in dependence on data transmitted by the communication unit.

The power tool device 10*a* further comprises at least one machining tool sensor unit 24*a* for recording at least one machining tool characteristic variable, which can be processed by the open-loop and/or closed-loop control unit 12*a* at least for providing an open-loop and/or closed-loop control of the drive unit 16*a* and/or for providing an output of information to an operator. For this purpose the machining tool sensor unit 24*a* comprises at least a machining tool sensor element 70*a*, 72*a*, 76*a*. At least in an initial learning operating mode, the open-loop and/or closed-loop control unit 12*a* is intended here for providing an at least partially automatic open-loop and/or closed-loop control of the drive unit 16*a* in dependence on the at least one drive unit characteristic variable recorded by means of the drive unit sensor unit 14*a*, in dependence on the at least one machining tool characteristic variable recorded by means of the machining tool sensor unit 24*a*, in dependence on the at least one ambient characteristic variable recorded by means of the ambient sensor unit 18*a* and in dependence on the at least one power tool accessory characteristic variable recorded by means of the power tool accessory sensor unit 32*a*. The initial learning operating mode is automatically activated after the power tool 34*a* is put into operation, until an idling speed is reached. A centrifugal mass of the machining tool 44*a* can be determined by means of the open-loop and/or closed-loop control unit 12*a* by way of at least one inertia sensor 56*a* of the machining tool sensor unit 24*a*, at least one torque sensor 58*a* of the machining tool sensor unit 24*a* and/or a current sensor 60*a* of the drive unit sensor unit 14*a* (FIG. 2). The inertia sensor 56*a* is preferably formed as a three-axis acceleration sensor. The determined centrifugal mass can be unequivocally assigned to a certain machining tool type by way of at least one characteristic map stored in a memory unit (not represented any more specifically here) of the open-loop and/or closed-loop control unit 12*a*. It is also conceivable that a recording of further machining tool characteristic variables additionally takes place by way of RFID, NFC, scanning a barcode, data matrix codes or the like. Drive unit parameters can be adapted and/or can be changed in dependence on the machining tool 44*a* determined by the open-loop and/or closed-loop control unit 12*a* for providing an open-loop and/or closed-loop control of the drive unit 16*a*.

In the initial learning operating mode of the power tool 34*a*, a rotational speed that is optimum for the machining tool 44*a* can be set at least partially automatically by means of the open-loop and/or closed-loop control unit 12*a* in dependence on a material (steel, stainless steel, stone, concrete, wood etc.) of a workpiece to be machined. For this purpose, the power tool device 10*a* has at least one workpiece sensor unit 30*a* for recording at least one workpiece characteristic variable, which can be processed by the open-loop and/or closed-loop control unit 12*a* at least for providing an open-loop and/or closed-loop control of the drive unit 16*a* and/or for providing an output of information to an operator. For this purpose, the workpiece sensor unit 30*a* comprises at least one workpiece sensor element 74*a* (FIG. 2). At least in the initial learning operating mode, the open-loop and/or closed-loop control unit 12*a* is intended here for providing an at least partially automatic open-loop and/or closed-loop control of the drive unit 16*a* in dependence on the at least one drive unit characteristic variable recorded by means of the drive unit sensor unit 14*a*, in dependence on the at least one ambient characteristic variable recorded by means of the ambient sensor unit 18*a*, in dependence on the at least one machining tool characteristic variable recorded by means of the machining tool sensor unit 24*a*, in dependence on the at least one power tool accessory characteristic variable recorded by means of the power tool accessory sensor unit 32*a* and in dependence on the at least one workpiece characteristic variable recorded by means of the workpiece sensor unit 30*a*.

Furthermore, in the initial learning operating mode of the power tool 34*a*, abnormalities with regard to vibration of the machining tool 44*a* during running up to an idling speed of the drive unit 16*a* can be recorded. As a result, incorrect mounting, wear and/or a defect of the machining tool 44*a* can be recorded. Consequently, by means of the open-loop and/or closed-loop control unit 12*a*, information can be output to an operator by way of an information output unit 36*a* of the power tool device 10*a* and/or the drive unit 16*a* can be actively decelerated and/or a power supply to the drive unit 16*a* can be interrupted. Moreover, as a result of a determination of the machining tool 44*a*, a rotational speed of the drive unit 16*a* that is suitable as a maximum for the machining tool 44*a* can be set. Consequently, at least in the initial learning operating mode, the open-loop and/or closed-loop control unit 12*a* determines a machining tool state and outputs the machining tool state by means of the information output unit 36*a* and/or makes allowance for the machining tool state for providing an open-loop and/or closed-loop control of the drive unit 16*a* of the power tool 34*a*.

Moreover, the power tool 34*a* has at least one machining tool securing unit 62*a*, which comprises at least one securing element (not represented any more specifically here) for securing the machining tool 44*a* to a tool holder 28*a* of the power tool 34*a*. Here, the machining tool sensor unit 24*a* has at least one securing sensor element 64*a*, which is intended for monitoring secure fastening of the machining tool 44*a* to the tool holder 28*a* in at least one operating mode. If the securing sensor element 64*a* records a detached state of the machining tool 44*a*, a power supply to the drive unit 16*a* can be interrupted by means of the open-loop and/or closed-loop control unit 12*a*. Consequently, operation of the drive unit 16*a* is disabled. It is conceivable that a drive spindle and/or a clamping nut of the power tool 34*a* has a bore into which the securing element is insertable, in particular is insertable by way of a servomotor, the position of which can be recorded by means of the securing sensor element 64*a*. Furthermore, it is also conceivable that a securing element formed as a clamping nut can be prestressed by means of a tightening unit formed as an actuator unit 26*a* to a defined torque, it being possible for the torque to be recorded by means of the torque sensor 58*a*. Consequently, the power tool device 10*a* comprises at least the actuator unit 26*a* for arresting the tool holder 28*a* of the power tool 34*a* at least in dependence on the at least one machine tool characteristic variable recorded by means of the machining tool sensor unit 24*a*.

Furthermore, in one configuration of the power tool device 10*a* a vibration exciter element 66*a* (FIG. 2) of the power tool device 10*a*, by means of which a secure arrangement of the machining tool 44*a* on the drive spindle can be checked, is arranged in the securing element formed as a clamping nut. The vibration exciter element 66*a* may be formed as a smart material element, as a piezo element, as an oscillating coil element or as some other exciter element that appears appropriate to a person skilled in the art. Here, the vibration exciter element 66*a* can be used to set the machining tool 44*a* in vibration, which can be recorded by means of the machining tool sensor unit 24*a* and can be evaluated by means of the open-loop and/or closed-loop control unit 12*a*. The machining tool 44*a* can furthermore be divided into portions by means of the open-loop and/or closed-loop control unit 12*a*, it being possible for each portion to be evaluated individually by the open-loop and/or closed-loop control unit 12*a* with regard to a vibration. Consequently, damage to the machining tool 44*a* in one portion can be advantageously detected. Further configurations that appear appropriate to a person skilled in the art for recording machining tool characteristic variables are likewise conceivable.

In a convenient operating mode of the power tool 34*a*, the machining tool 44*a* can be actively decelerated, in particular actively decelerated in a pulsed manner, by the open-loop and/or closed-loop control unit 12*a* after switching off of the power tool 34*a* by means of an open-loop and/or closed-loop control of a braking unit of the power tool device 10*a* and/or of the drive unit 16*a*. As a result, the securing element formed as a clamping nut on the drive spindle can be loosened. Changing and/or removing the machining tool 44*a* easily and without tools can be advantageously achieved. For determining a braking moment for loosening the clamping nut, a moment of inertia of the machining tool 44*a* when running up from a standstill to an idling speed can be determined. For this purpose, the moment of inertia of the machining tool 44*a* can be determined by means of the machining tool sensor unit 24*a*, in that parameters such as the run-up time, required torque for an acceleration and/or a rotational speed of the machining tool 44*a* can be recorded.

Moreover, in the convenient operating mode of the power tool 34*a*, after switching off of the power tool 34*a* the drive spindle and/or an output element formed as a ring gear (not represented any more specifically here) of the output unit 52*a* can be positioned by the open-loop and/or closed-loop control unit 12*a* by means of an open-loop and/or closed-loop control of the drive unit 16*a* in such a way that the drive spindle and/or the output element formed as a ring gear can be conveniently arrested in an arresting position by means of an arresting element. For this purpose, after switching off of the power tool 34*a*, a position of an output shaft of the drive unit 16*a* is recorded by means of the drive unit sensor unit 14*a*, such as for example by means of a position sensor (rotary encoder, resolver, Hall sensors etc.) of the drive unit sensor unit 14*a*. From this, a position of the drive spindle can be calculated by means of the open-loop and/or closed-loop control unit 12*a*. From the calculated position of the drive spindle, a position of the output element connected to the drive spindle for rotation therewith can be calculated. The open-loop and/or closed-loop control unit 12*a* controls the drive unit 16*a* in an open-loop and/or closed-loop manner in such a way that at least one arresting recess of the output element comes to a standstill in line with the arresting element. Consequently, the arresting element can be inserted by an operator directly into the arresting recess. It is however also conceivable that the machining tool sensor unit 24*a* comprises a machining tool sensor element 70*a*, 72*a*, 76*a*, which is intended for recording a position of the output element and that the open-loop and/or closed-loop control unit 12*a* controls the drive unit 16*a* in an open-loop and/or closed-loop manner in dependence on an output element characteristic variable recorded by means of the machining tool sensor element 70*a*, 72*a*, 76*a* for a positioning of the output element in an arresting position. As a result, moreover, a machining tool position of the machining tool 44*a* arranged on a tool holder 28*a* of the power tool 34*a* can also be recorded. Consequently, the open-loop and/or closed-loop control unit 12*a* is intended for determining at least in dependence on at least one drive unit characteristic variable recorded by means of the drive unit sensor unit 14*a* a machining tool position of a machining tool 44*a* arranged on a tool holder 28*a* of the power tool.

Furthermore, the power tool device 10*a* comprises at least one working area lighting unit 92*a*, which can be controlled by the open-loop and/or closed-loop control unit 12*a* in an open-loop and/or closed-loop manner in dependence on the at least one ambient characteristic variable recorded by means of the ambient sensor unit 18*a*.

The power tool device 10*a* further comprises at least one input unit 32*a* for providing an input of at least one machining characteristic variable, which can be processed by the open-loop and/or closed-loop control unit 12*a* at least for providing an open-loop and/or closed-loop control of the drive unit 16*a*. By means of the input unit 32*a*, at least an open-loop and/or closed-loop control of the drive unit 16*a* can be influenced by the open-loop and/or closed-loop control unit 12*a*. Moreover, by means of the input unit 32*a*, an operating mode of the power tool 34*a* can be set. The power tool 34*a* has here at least the initial learning operating mode, a learning operating mode, a reference operating mode, a safety operating mode, a synchronization operating mode, the emission operating mode, the convenient operating mode and/or an automatic operating mode. At least in the emission operating mode, the open-loop and/or closed-loop control unit 12*a* is intended here for providing an at least partially automatic open-loop and/or closed-loop control of the drive unit 16*a* in dependence on the at least one drive unit characteristic variable recorded by means of the drive unit sensor unit 14*a*, in dependence on the at least one ambient characteristic variable recorded by means of the ambient sensor unit 18*a* and in dependence on the electronic data received at least by means of the communication unit 20*a* of the power tool device 10*a*.

In the automatic operating mode of the power tool 34*a*, the aforementioned operating modes are selected automatically by the open-loop and/or closed-loop control unit 12*a*, in particular in dependence on recorded characteristic variables that can be determined by means of the aforementioned sensor units. In the automatic operating mode there is an at least substantially automatic open-loop and/or closed-loop control of the drive unit 16a by the open-loop and/or closed-loop control unit 12a in dependence on the machining tool sensor unit 24a, on the ambient sensor unit 18a, on the workpiece sensor unit 30a, on the power tool accessory sensor unit 32a and on the drive unit sensor unit 14a.

Figure 3:
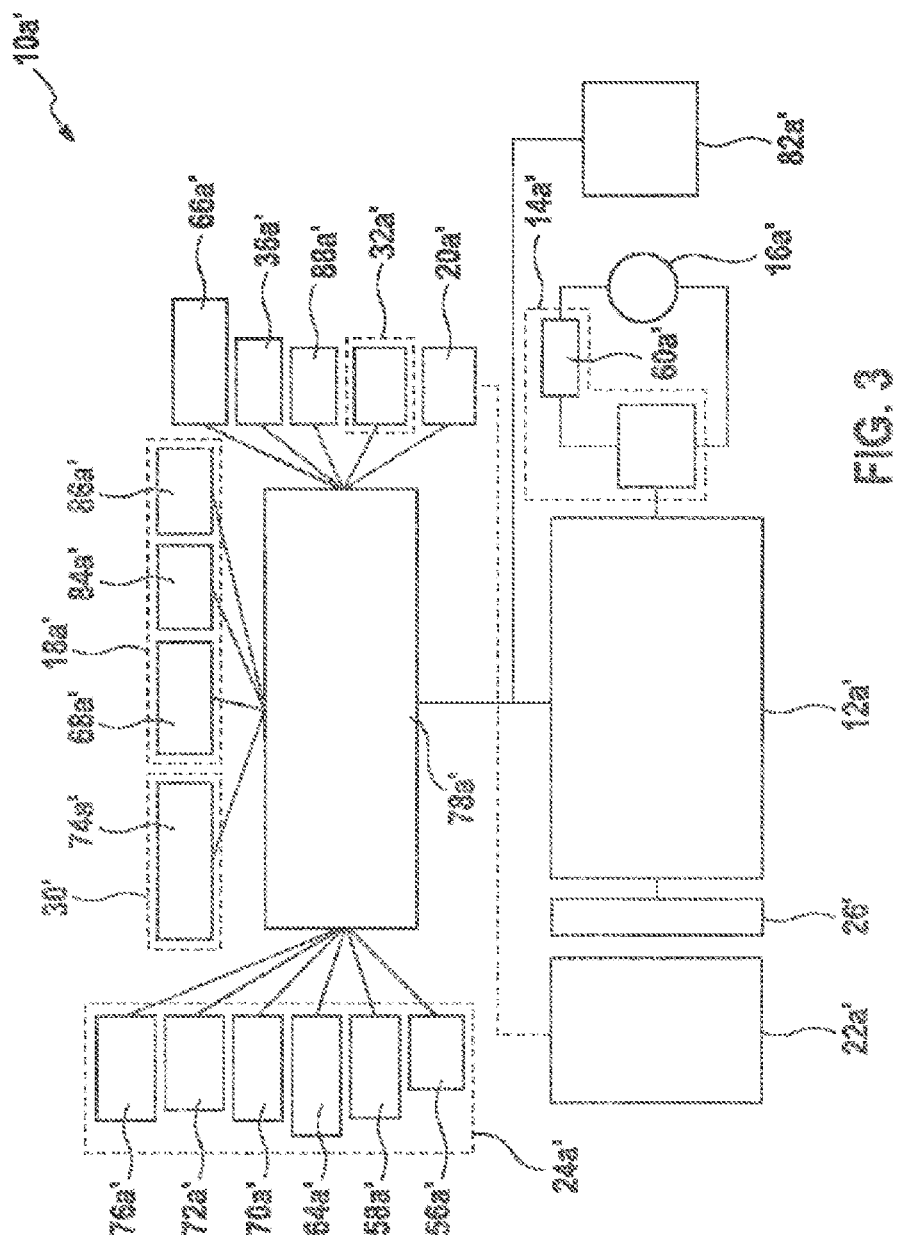
FIG. 3 shows a schematic representation of an alternative power tool device according to the disclosure.

In FIG. 3, an alternative power tool device 10a' is represented. The alternative power tool device 10a' has an at least substantially analogous configuration in comparison with the power tool device 10a schematically represented in FIG. 2. As a difference from the power tool device 10a schematically represented in FIG. 2, the alternative power tool device 10a' schematically represented in FIG. 3 has at least one preprocessing unit 78a'. The preprocessing unit 78a' is intended to organize a communication of a number of sensor elements and/or sensor units of the alternative power tool device 10a' with one another and/or with an open-loop and/or closed-loop control unit 12a' of the alternative power tool device 10a'. The preprocessing unit 78a' is intended here to combine individual sensor signals and make preliminary decisions. A communication between the preprocessing unit 78a' and the open-loop and/or closed-loop control unit 12a' may take place here in a cableless and/or cable-bound manner.

Figure 4:
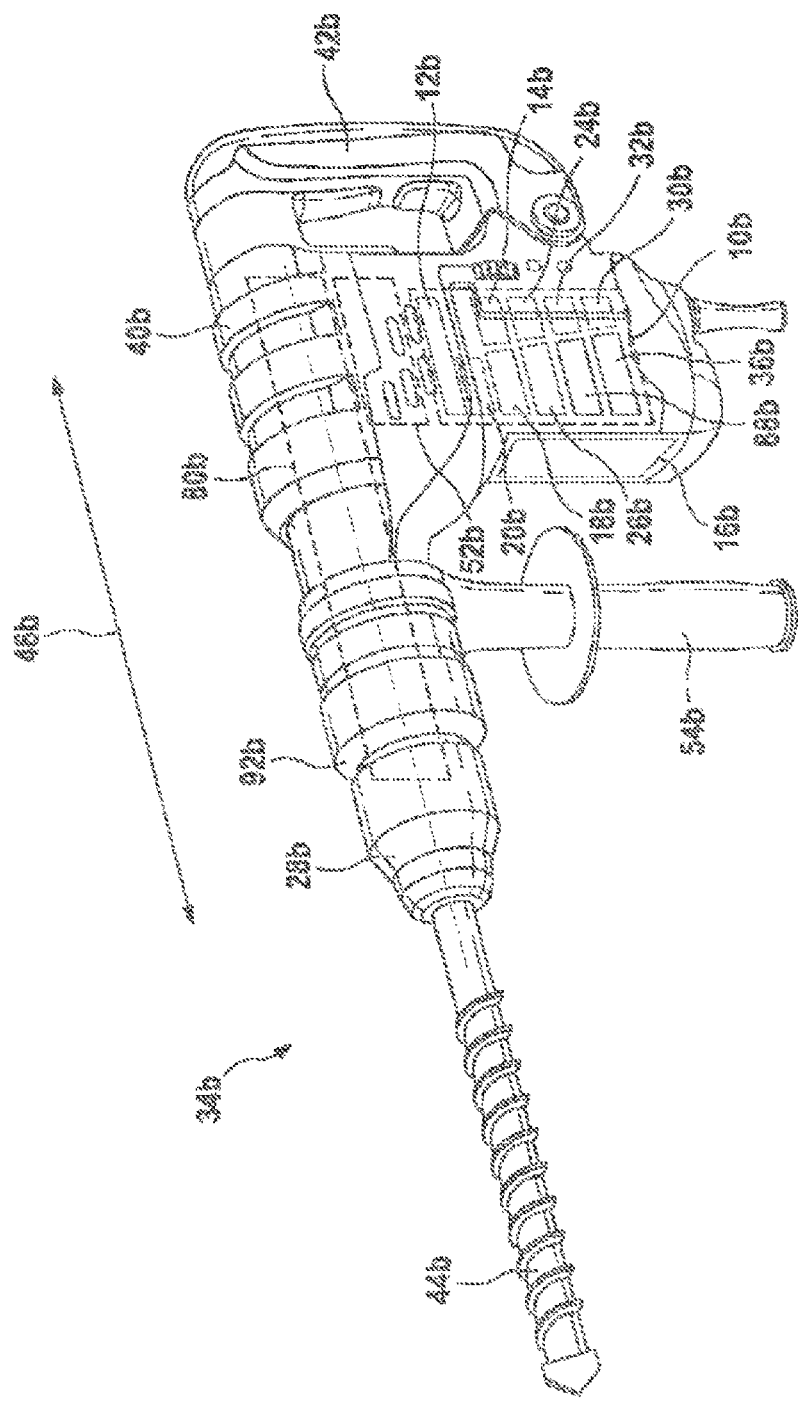
FIG. 4 shows an alternative power tool according to the disclosure, which is formed as a hammer drill and/or a chipping hammer, with a power tool device according to the disclosure in a schematic representation.
Figure 5:
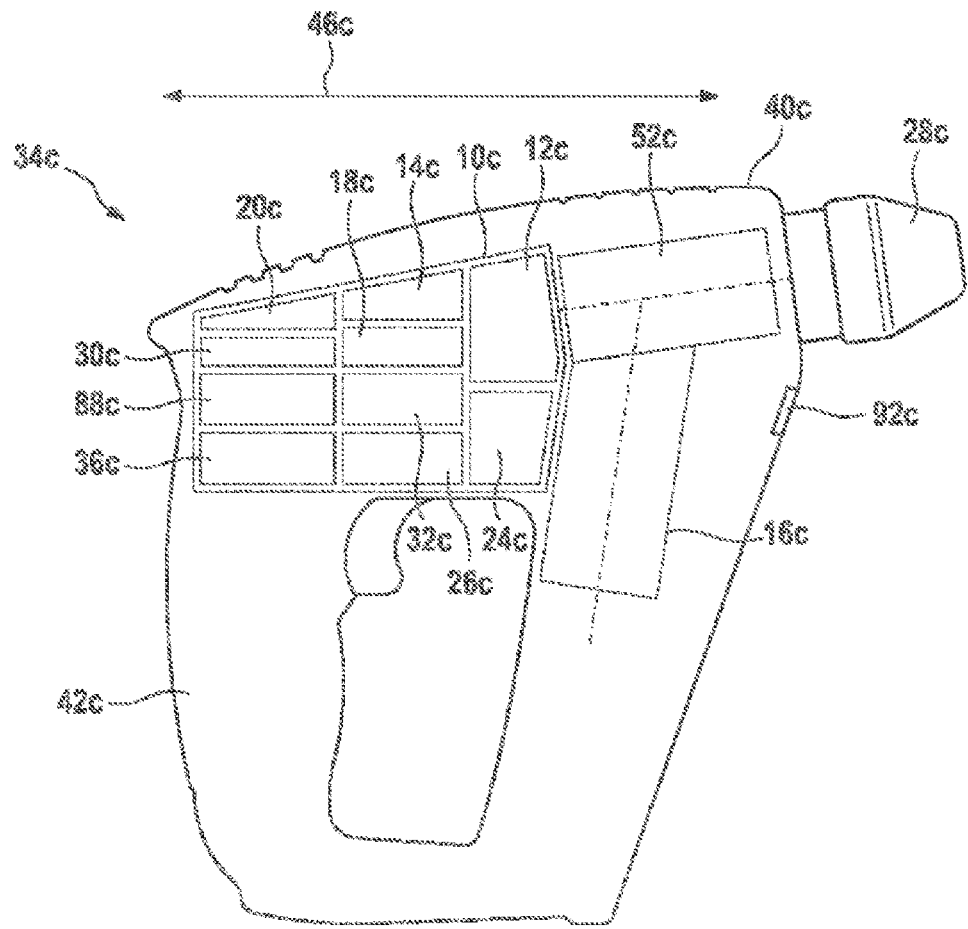
FIG. 5 shows a further alternative power tool according to the disclosure, which is formed as a battery-operated screwdriver, with a power tool device according to the disclosure in a schematic representation
Figure 6:
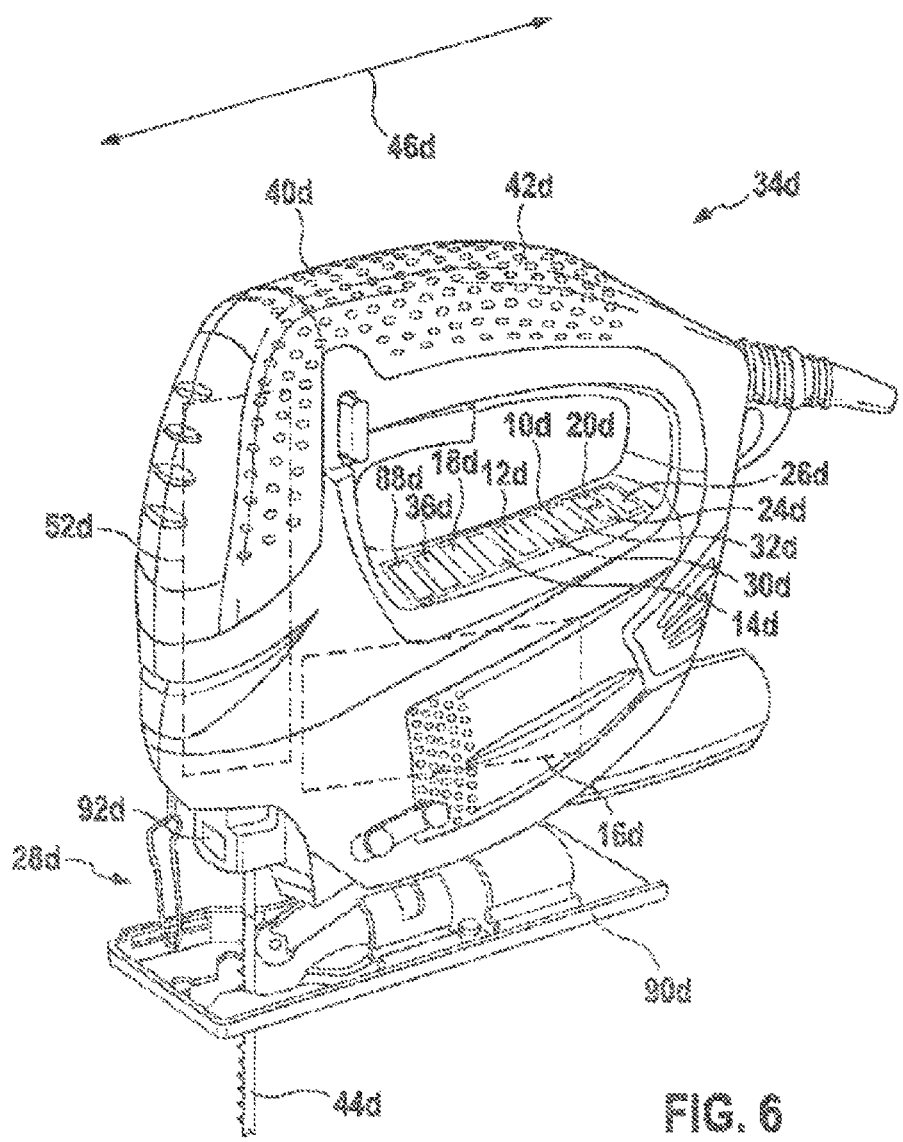
FIG. 6 shows a further alternative power tool according to the disclosure, which is formed as a jigsaw, with a power tool device according to the disclosure in a schematic representation.

FIGS. 4 to 6 show further exemplary embodiments of the disclosure. The following description and the drawing are substantially confined to the differences between the exemplary embodiments, it being possible in principle also to refer to the drawing and/or the description of the other exemplary embodiments, in particular of FIGS. 1 to 3, with respect to components with the same designations, in particular with respect to components with the same reference numerals. To distinguish between the exemplary embodiments, the letter a has been added after the reference numerals of the exemplary embodiment in FIGS. 1 to 3. In the exemplary embodiments of FIGS. 4 to 6, the letter a has been substituted by the letters b or c.

FIG. 4 shows a power tool 34b with at least one power tool device 10b. The power tool 34b is formed as a portable power tool. The power tool 34b is formed here as a hammer drill and/or a chipping hammer. The power tool 34b comprises at least one percussion mechanism device 80b. The power tool 34b further comprises a power tool housing 40b, arranged on which, in a front region, is a tool holder 28b of the power tool 34b for receiving a machining tool 44b. On a side facing away from the front region, the power tool 34b comprises a main handle 42b for guiding the power tool 34b and for transmission of a force, in particular a pressing force, from an operator to the power tool 34b. The power tool 34b is further formed with a detachable additional handle unit. The additional handle unit may be detachably fastened here to the power tool housing 40b by way of a snap-in connection or other connections that appear appropriate to a person skilled in the art.

For generating a drive moment and for generating a percussive impulse by means of the percussion mechanism device 80b, the power tool 34b has a drive unit 16b. By way of an output unit 52b of the power tool 34b, a drive moment of the drive unit 16b for generating a percussive impulse is transmitted to the percussion mechanism device 80b. It is however also conceivable that the power tool 34b is formed in such a way that it is decoupled from the output unit 52b and the drive unit 16b acts substantially directly on the percussive mechanism device 80b for generating a percussive impulse. A percussive impulse of the percussion mechanism device 80b is generated in a way that is known to a person skilled in the art. A rotating drive of the tool holder 28b, and consequently of the machining tool 44b, is likewise generated in a way that is already known to a person skilled in the art.

By analogy with the power tool device 10a described in the description of FIGS. 1 to 3, the power tool device 10b comprises at least one machining tool sensor unit 24b, at least one ambient sensor unit 18b, at least one workpiece sensor unit 30b, at least one power tool accessory sensor unit 32b, at least one input unit 88b, at least one communication unit 20b and at least one information output unit 36b.

By means of the input unit 32b, an operating mode of the power tool 34b can be set. The power tool 34b has here at least an initial learning operating mode, a learning operating mode, a reference operating mode, a safety operating mode, a synchronization operating mode, an emission operating mode, a convenient operating mode and/or an automatic operating mode. In the convenient operating mode, into the drive unit 16b for realizing an automatic direction of rotation reversal function in dependence on a machining tool characteristic variable recorded by means of the machining tool sensor unit 24b, such as for example a machining tool dimension, and in dependence on a workpiece characteristic variable recorded by means of the workpiece sensor unit 30b, such as for example a distance between the power tool 34b and a workpiece controllable by the open-loop and/or closed-loop control unit 12b in an open-loop and/or closed-loop manner. When a drilling depth set by means of the input unit 88b is reached, a direction of rotation reversal of the drive unit 16b can be activated here. This direction of rotation reversal is advantageously very smooth, that is to say not abrupt. Moreover, a rotational speed of the drive unit 16b is lower than a rotational speed during a drilling operation. As a result of the direction of rotation reversal, jamming of the machining tool 44b in the workpiece can be advantageously prevented. Moreover, an operator is advantageously assisted in removing the machining tool 44b from the workpiece.

Moreover, in the convenient operating mode, a tool changing function can be controlled by means of the open-loop and/or closed-loop control unit 12b in an open-loop and/or closed-loop manner. Here, in at least one operating mode, the open-loop and/or closed-loop control unit 12b at least partially automatically opens and/or closes a tool holder 28b of the power tool 34b. For this purpose, the power tool device 10b comprises at least one actuator unit 26b for actuating and/or arresting the tool holder 28b of the power tool 34b at least in dependence on at least one machining tool characteristic variable recorded by means of the machining tool sensor unit 24b. Here, arrestment of the tool holder 28b can be released by means of the actuator unit 26b. The machining tool 44b arranged in the tool holder 28b can consequently be removed. If the machining tool sensor unit 24b records insertion of a machining tool 44b into the tool holder 28b, the actuator unit 26b can be automatically activated by the open-loop and/or closed-loop control unit 12b for arrestment of the tool holder 28b. The actuator unit 26b may be formed here as a servo motor with a spindle transmission, as a linear motor or as a pneumatic cylinder, which can be subjected to a pressure by means of the percussion mechanism device 80b directly or indirectly by way of a pressure accumulator. A one-handed tool change can consequently be advantageously realized, since an operator can hold the power tool 34b with one hand and insert/change the machining tool 44b with another hand.

In the emission operating mode, a noise emission and/or a dust emission of the power tool 34b can be recorded by means of the ambient sensor unit 18b. If the open-loop and/or closed-loop control unit 12b detects exceeding of a noise emission limit value that has been input by means of the input unit 88b or has been transmitted by means of the communication unit 20b, an impact energy and/or a number of percussions of the percussion mechanism device 80b and/or a rotational speed of the drive unit 16b can be reduced. Consequently, the open-loop and/or closed-loop control unit 12b determines by way of the ambient sensor unit 18b at least one ambient influence by the power tool 34b and makes allowance for the ambient influence by the power tool 34b at least for providing an open-loop and/or closed-loop control of the drive unit 16b of the power tool 34b. If the open-loop and/or closed-loop control unit 12b detects exceeding of a dust emission limit value that has been input by means of the input unit 88b or has been transmitted by means of the communication unit 20b, a dust extractor connected to the power tool 34b can be activated and/or can additionally be put into a high-power suction mode. If the open-loop and/or closed-loop control unit 12b detects a low dust emission of the power tool 34b, the dust extractor connected to the power tool 34b can be switched over into a low-power mode, in order to keep noise emissions low. With regard to further features of the power tool device 10b, reference may be made to the power tool device 10a described in the description of FIGS. 1 to 3.

FIG. 5 shows a power tool 34c with at least one power tool device 10c. The power tool 34c is formed as a portable power tool. The power tool 34c is formed here as a battery-operated screwdriver. The power tool 34c comprises at least one power tool housing 40c, arranged on which, in a front region, is a tool holder 28c of the power tool 34c for receiving a machining tool (not represented any more specifically here). On a side facing away from the front region, the power tool 34c comprises a main handle 42c for guiding the power tool 34c and for transmission of a force, in particular a pressing force, from an operator to the power tool 34c. The power tool 34c has a drive unit 16c for generating a drive moment. A drive moment of the drive unit 16c for generating a rotational movement is transmitted to the tool holder 28c by way of an output unit 52c of the power tool 34c. It is however also conceivable that the power tool 34c is formed in such a way that it is decoupled from the output unit 52c and the drive unit 16c acts substantially directly on the tool holder 28c for generating a rotational movement. A rotating drive of the tool holder 28c and of the machining tool is consequently produced in a way that is already known to a person skilled in the art.

By analogy with the power tool device 10a described in the description of FIGS. 1 to 3, the power tool device 10c comprises at least one machining tool sensor unit 24c, at least one ambient sensor unit 18c, at least one workpiece sensor unit 30c, at least one power tool accessory sensor unit 32c, at least one input unit 88c, at least one communication unit 20c and at least one information output unit 36c.

By means of the input unit 88c, an operating mode of the power tool 34c can be set. The power tool 34c has here at least an initial learning operating mode, a learning operating mode, a reference operating mode, a safety operating mode, a synchronization operating mode, an emission operating mode, a convenient operating mode and/or an automatic operating mode. Here, in the convenient operating mode, a tool changing function can be controlled by means of the open-loop and/or closed-loop control unit 12c in an open-loop and/or closed-loop manner. Here, the open-loop and/or closed-loop control unit 12c in at least one operating mode opens and/or closes the tool holder 28c of the power tool 34c at least partially automatically. For this purpose, the power tool device 10c comprises at least one actuator unit 26c for actuating and/or arresting the tool holder 28c of the power tool 34c at least in dependence on at least one machining tool characteristic variable recorded by means of the machining tool sensor unit 24c. Arrestment of the tool holder 28c can be released here by means of the actuator unit 26c. The machining tool 44c arranged in the tool holder 28c can consequently be removed. If the machining tool sensor unit 24c records an insertion of a machining tool 44c into the tool holder 28c, the actuator unit 26c can be automatically activated by the open-loop 28c and/or closed-loop control unit 12c for arresting the tool holder 28c. The actuator unit 26c may be formed here as a servo motor, as a linear motor, as an electromagnetic clutch or as some other actuator unit that appears appropriate to a person skilled in the art.

In the emission operating mode, a noise emission of the power tool 34c can be recorded by means of the ambient sensor unit 18c. If the open-loop and/or closed-loop control unit 12c detects exceeding of a noise emission limit value that has been input by means of the input unit 88c or has been transmitted by means of the communication unit 20c, a characteristic curve of a braking unit of the power tool 34c can be changed and/or a rotational speed of the drive unit 16c can be reduced. Consequently, the open-loop and/or closed-loop control unit 12c determines by way of the ambient sensor unit 18c at least one ambient influence by the power tool 34c and makes allowance for the ambient influence by the power tool 34c at least for providing an open-loop and/or closed-loop control of the drive unit 16c of the power tool 34c. With regard to further features of the power tool device 10c, reference may be made to the power tool device 10a described in the description of FIGS. 1 to 3.

FIG. 6 shows a power tool 34d with at least one power tool device 10d. The power tool 34d is formed as a portable power tool. Here, the power tool 34d is formed as a jigsaw. The power tool 34d has a power tool housing 40d, which encloses a drive unit 16d of the power tool 34d and an output unit 52d of the power tool 34d. The drive unit 16d and the output unit 52d are intended for driving in an oscillating manner a machining tool 44d clamped in a tool holder 28d of the power tool 34d. Here, the machining tool 44d is driven in an oscillating manner substantially perpendicularly in relation to a machining direction. The machining tool 44d is formed as a jigsaw blade. It is however also conceivable that the machining tool 44d is formed by some other machining tool that appears appropriate to a person skilled in the art. An oscillating drive of the machining tool 44d takes place here in a way that is already known to a person skilled in the art.

By analogy with the power tool device 10a described in the description of FIGS. 1 to 3, the power tool device 10d comprises at least one machining tool sensor unit 24d, at least one ambient sensor unit 18d, at least one workpiece sensor unit 30d, at least one power tool accessory sensor unit 32d, at least one input unit 88d, at least one communication unit 20d and at least one information output unit 36d.

By means of the input unit 88c, an operating mode of the power tool 34c can be set. The power tool 34c has here at least an initial learning operating mode, a learning operating mode, a reference operating mode, a safety operating mode, a synchronization operating mode, an emission operating mode, a convenient operating mode and/or an automatic operating mode. Here, in the convenient operating mode, after switching off of the power tool 34d, the machining tool 44d can be stopped in a stowage position, in which the machining tool 44*d* projects by the minimum amount beyond the power tool housing 40*d* and/or a base plate 90*d* of the power tool 34*d*. For this purpose, a position of the machining tool 44*d* in relation to the power tool housing 40*d* and/or the base plate 90*d* can be recorded by means of the machining tool sensor unit 24*d*. On the basis of the recorded position of the machining tool 44*d*, the open-loop and/or closed-loop control unit 12*d* controls the drive unit 16*d* in an open-loop and/or closed-loop manner in such a way that the machining tool 44*d* comes to a standstill in the stowage position. Consequently, space-saving stowage of the power tool 34*d* can be advantageously made possible.

Moreover, in the convenient operating mode, a tool changing function can be activated manually and/or automatically. In the convenient operating mode, after switching off of the power tool 34*d*, the machining tool 44*d* can be stopped here in a tool changing position, in which the machining tool 44*d* projects by the maximum amount beyond the power tool housing 40*d* and/or the base plate 90*d*. For this purpose, a position of the machining tool 44*d* in relation to the power tool housing 40*d* and/or the base plate 90*d* can be recorded by means of the machining tool sensor unit 24*d*. On the basis of the recorded position of the machining tool 44*d*, the open-loop and/or closed-loop control unit 12*d* controls the drive unit 16*d* in an open-loop and/or closed-loop manner in such a way that the machining tool 44*d* comes to a standstill in the tool changing position. The tool changing function can be activated manually by an operator and/or the ambient sensor unit 18*d* detects a spatial alignment of the power tool 34*d* and a contact with a surface on a side of the power tool housing 40*d* that is facing away from the tool holder 28*d*. Consequently, a convenient tool change can be advantageously carried out.

In the emission operating mode, vibrating of a workpiece during machining can be recorded by means of the workpiece sensor unit 30*d*. As a result, advantageously a noise emission of the workpiece can be advantageously detected. The open-loop and/or closed-loop control unit 12*d* evaluates the recorded vibration of the workpiece and activates a counteracting vibrator unit (not represented any more specifically here) of the power tool 34*d* and/or changes a stroke frequency and/or an orbital stroke for influencing the vibration of the workpiece.

In the emission operating mode, a noise emission and/or a dust emission of the power tool 34*d* can be further recorded by means of the ambient sensor unit 18*d*. If the open-loop and/or closed-loop control unit 12*d* detects exceeding of a noise emission limit value that has been input by means of the input unit 88*d* or has been transmitted by means of the communication unit 20*d*, a stroke frequency, an orbital stroke and/or a rotational speed can be reduced. Consequently, the open-loop and/or closed-loop control unit 12*d* determines by way of the ambient sensor unit 18*d* at least one ambient influence by the power tool 34*d* and makes allowance for the ambient influence by the power tool 34*d* at least for providing an open-loop and/or closed-loop control of the drive unit 16*d* of the power tool 34*d*. If the open-loop and/or closed-loop control unit 12*b* detects exceeding of a dust emission limit value that has been input by means of the input unit 88*d* or has been transmitted by means of the communication unit 20*d*, a dust extractor connected to the power tool 34*d* can be activated and/or can additionally be put into a high-power suction mode. If the open-loop and/or closed-loop control unit 12*d* detects a low dust emission of the power tool 34*d*, the dust extractor connected to the power tool 34*d* can be switched over into a low-power mode, in order to keep noise emissions low.

With regard to further features of the power tool device 10*d*, reference may be made to the power tool device 10*a* described in the description of FIGS. 1 to 3.

The invention claimed is:

1. A power tool device, comprising:
    a drive unit sensor unit configured to record at least one characteristic variable of a drive unit in a power tool;
    an ambient sensor unit configured to record a noise emission of the power tool and a dust emission of the power tool; and
    a control unit connected to the drive unit, the drive unit sensor unit, and the ambient sensor, the control unit being configured to:
        perform one of (i) open loop and (ii) closed loop control of the drive unit based on the at least one characteristic variable;
        identify whether the noise emission of the power tool device exceeds a noise emission limit value;
        identify whether the dust emission of the power tool falls below a dust emission limit value;
        reduce a rotational speed of the drive unit in response to the noise emission of the power tool device exceeding the noise emission limit value; and
        reduce a suction power of a dust extractor connected to the power tool in response to the dust emission of the power tool falling below the dust emission limit value.

2. The power tool device as claimed in claim 1, further comprising:
    at least one communication unit configured to communicate with at least one external unit for an exchange of electronic data at least for providing the noise emission limit value and the dust emission limit value to the control unit.

3. The power tool device as claimed in claim 2, wherein the control unit is configured to access a central database with the at least one communication unit, in which there is stored the noise emission limit value and the dust emission limit value.

4. The power tool device as claimed in claim 1, wherein the power tool device is included in a power tool.

5. A power tool system comprising:
    at least one power tool including a drive unit and a power tool device; and
    at least one external unit,
    wherein the power tool device comprises:
        a drive unit sensor unit configured to record at least one characteristic variable of a drive unit in a power tool;
        an ambient sensor unit configured to record a noise emission of the power tool device and a dust emission of the power tool;
        a communication unit configured to communicate with the at least one external unit for an exchange of electronic data; and
        a control unit connected to the drive unit, the drive unit sensor unit, the ambient sensor, and the communication unit, the control unit being configured to:
            perform one of (i) open loop and (ii) closed loop control of the drive unit based on the at least one characteristic variable;
            communicate with the at least one external unit for an exchange of electronic data at least for providing a limit value corresponding to a limit of emitted noise for the at least one power tool using the communication unit;
            identify whether the noise emission of the power tool device exceeds a noise emission limit value;

identify whether the dust emission of the power tool falls below a dust emission limit value;

reduce a rotational speed of the drive unit in response to the noise emission of the power tool device exceeding the noise emission limit value; and reduce a suction power of a dust extractor connected to the power tool in response to the dust emission of the power tool falling below the dust emission limit value.

6. A method for controlling a power tool in open-loop and/or closed-loop manner, comprising:

receiving, with a control unit, at least one characteristic variable of a drive unit in the power tool recorded by a drive unit sensor unit;

performing, with the control unit, one of (i) open loop and (ii) closed loop control of the drive unit based on the at least one characteristic variable;

receiving, with the control unit, a noise emission of the power tool and a dust emission of the power tool recorded by an ambient sensor unit configured to detect the noise emission of the power tool and the dust emission of the power tool;

identifying, with the control unit, whether the noise emission of the power tool device exceeds a noise emission limit value;

identifying, with the control unit, whether the dust emission of the power tool falls below a dust emission limit value;

reducing, with the control unit, a rotational speed of the drive unit in response to the noise emission of the power tool device exceeding the noise emission limit value; and reducing, with the control unit, a suction power of a dust extractor connected to the power tool in response to the dust emission of the power tool falling below the dust emission limit value.

7. The method as claimed in claim 6, further comprising:

accessing, with the control unit, a central database using a communication unit to retrieve the noise emission limit value and the dust emission limit value from the central database.

* * * * *

UNITED STATES PATENT AND TRADEMARK OFFICE
CERTIFICATE OF CORRECTION

PATENT NO. : 10,331,088 B2
APPLICATION NO. : 15/114382
DATED : June 25, 2019
INVENTOR(S) : Boeck et al.

Page 1 of 1

It is certified that error appears in the above-identified patent and that said Letters Patent is hereby corrected as shown below:

On the Title Page

Page 2, Column 2, Item (56) References Cited:
"DE 10 2012 221 580 A1 1/2014" should read --DE 10 2012 211 580 A1 1/2014--.

Signed and Sealed this
Seventeenth Day of September, 2019

Andrei Iancu
*Director of the United States Patent and Trademark Office*